(12) United States Patent
Xue et al.

(10) Patent No.: US 11,570,753 B2
(45) Date of Patent: Jan. 31, 2023

(54) METHOD AND APPARATUS OF FLEXIBLE DATA TRANSMISSIONS AND RECEPTIONS IN NEXT GENERATION CELLULAR NETWORKS

(71) Applicant: Samsung Electronics Co., Ltd., Suwon-si (KR)

(72) Inventors: Peng Xue, Suwon-si (KR); Hyunseok Ryu, Yongin-si (KR); Anil Agiwal, Suwon-si (KR); Hyunkyu Yu, Suwon-si (KR); Yeohun Yun, Hwaseong-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/242,845

(22) Filed: Apr. 28, 2021

(65) Prior Publication Data

US 2021/0250906 A1    Aug. 12, 2021

Related U.S. Application Data

(63) Continuation of application No. 16/695,966, filed on Nov. 26, 2019, now Pat. No. 11,134,470, which is a (Continued)

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0048* (2013.01); *H04L 5/0053* (2013.01);
(Continued)

(58) Field of Classification Search
CPC ........ H04L 5/001; H04L 5/0048; H04W 4/70; H04W 56/001; H04W 72/005; H04W 72/042; H04W 72/121; H04W 72/14
(Continued)

(56) References Cited

U.S. PATENT DOCUMENTS

| | | |
|---|---|---|
| 2008/0205351 A1 | 8/2008 | Lindoff et al. |
| 2011/0235743 A1 | 9/2011 | Lee et al. |

(Continued)

FOREIGN PATENT DOCUMENTS

| | | |
|---|---|---|
| CN | 102823168 A | 12/2012 |
| CN | 103828467 A | 5/2014 |

(Continued)

OTHER PUBLICATIONS

NEC, 'Discussion on numerology multiplexing', R1-166637, 3GPP TSG RAN WG1 Meeting #86, Aug. 12, 2016, Gothenburg, Sweden.

(Continued)

*Primary Examiner* — Robert J Lopata
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for Internet of Things (IoT) is provided. The present disclosure may be applied to intelligent services based on the 5G communication technology and the IoT-related technology, such as smart home, smart building, smart city, smart car, connected car, health care, digital education, smart retail, security and safety services. The method for obtaining numerology information by a user equipment (UE) includes detecting synchronization signals, obtaining first numerology information for the synchronization signals, decoding a physical broadcast channel (PBCH) based on the first numerology information, obtaining second (Continued)

numerology information for a physical downlink control channel (PDCCH) according to a result of the decoding, and receiving control information on the PDCCH based on the second numerology information.

16 Claims, 35 Drawing Sheets

Related U.S. Application Data continuation of application No. 15/801,897, filed on Nov. 2, 2017, now Pat. No. 10,499,371.

(60) Provisional application No. 62/443,278, filed on Jan. 6, 2017, provisional application No. 62/416,941, filed on Nov. 3, 2016.

(51) Int. Cl.
| | | |
|---|---|---|
| *H04W 4/70* | (2018.01) | |
| *H04W 56/00* | (2009.01) | |
| *H04W 72/04* | (2009.01) | |
| *H04W 72/12* | (2009.01) | |
| *H04W 72/14* | (2009.01) | |

(52) U.S. Cl.
CPC .......... *H04L 5/0064* (2013.01); *H04L 5/0094* (2013.01); *H04W 4/70* (2018.02); *H04W 56/001* (2013.01); *H04W 72/042* (2013.01); *H04L 5/001* (2013.01); *H04W 72/121* (2013.01); *H04W 72/14* (2013.01)

(58) Field of Classification Search
USPC .......................................................... 370/312
See application file for complete search history.

(56) References Cited

U.S. PATENT DOCUMENTS

| | | | |
|---|---|---|---|
| 2012/0039256 A1 | 2/2012 | Kwon et al. | |
| 2013/0083749 A1 | 4/2013 | Xu et al. | |
| 2015/0043491 A1 | 2/2015 | Eng et al. | |
| 2015/0305005 A1* | 10/2015 | Webb | H04W 4/70 370/336 |
| 2015/0327107 A1 | 11/2015 | Kim et al. | |
| 2015/0341912 A1 | 11/2015 | Kim et al. | |
| 2016/0056934 A1 | 2/2016 | Li et al. | |
| 2016/0174238 A1 | 6/2016 | Chen et al. | |
| 2016/0212626 A1* | 7/2016 | Simon | H04W 16/14 |
| 2017/0288830 A1* | 10/2017 | Fischer | H04W 72/042 |
| 2017/0311276 A1* | 10/2017 | Tsai | H04L 27/26025 |
| 2017/0311315 A1* | 10/2017 | Islam | H04L 27/2646 |
| 2017/0353257 A1* | 12/2017 | Islam | H04L 25/022 |
| 2017/0359791 A1* | 12/2017 | Onggosanusi | H04L 5/0053 |
| 2018/0049047 A1* | 2/2018 | Lin | H04L 5/0007 |
| 2018/0049169 A1* | 2/2018 | Lin | H04L 5/0007 |
| 2018/0054292 A1 | 2/2018 | Yang et al. | |
| 2018/0084593 A1* | 3/2018 | Chen | H04L 27/2692 |
| 2018/0092064 A1 | 3/2018 | Ryu et al. | |
| 2018/0097678 A1 | 4/2018 | Zhou et al. | |
| 2018/0098361 A1* | 4/2018 | Ji | H04W 74/0866 |
| 2018/0110019 A1* | 4/2018 | Ly | H04L 27/2613 |
| 2018/0131487 A1* | 5/2018 | Ly | H04W 56/001 |
| 2018/0317212 A1* | 11/2018 | Kazmi | H04W 56/001 |
| 2019/0036634 A1* | 1/2019 | Cheng | H04W 48/16 |
| 2019/0059075 A1* | 2/2019 | Hayashi | H04W 72/04 |
| 2019/0069218 A1* | 2/2019 | Ribeiro | H04W 48/12 |
| 2020/0076563 A1* | 3/2020 | Yang | H04L 5/0091 |
| 2020/0099499 A1 | 3/2020 | Yeo et al. | |
| 2020/0228383 A1* | 7/2020 | Kim | H04L 27/26 |

FOREIGN PATENT DOCUMENTS

| | | |
|---|---|---|
| CN | 104105138 A | 10/2014 |
| CN | 105099627 A | 11/2015 |
| CN | 101636992 A | 1/2020 |
| KR | 10-2018-0035644 A | 4/2018 |
| WO | 2009/038429 A2 | 3/2009 |
| WO | 2015/023604 A1 | 2/2015 |
| WO | 2016/004900 A1 | 1/2016 |
| WO | 2016/130175 A1 | 8/2016 |
| WO | 2018/062771 A1 | 4/2018 |

OTHER PUBLICATIONS

Interdigital Communication, 'DL control channel framework for NR', R1-1610089, 3GPP TSG-RAN WG1 #86bis, Oct. 1, 2016, Lisbon, Portugal.
ETRI, 'On design of mixed numerology in a NR carrier', R1-166941, 3GPP TSG RAN WG1 Meeting #86, Aug. 13, 2016, Gothenburg, Sweden.
Samsung, 'Discussion on symbol alignment across scaled numerology', R1-166753, 3GPP TSG RAN WG1#86, Aug. 12, 2016, Gothenburg, Sweden.
NTT Docomo et al: "Discussion on initial access design for NR", 3GPP Draft; R1-1610073_Discussion on Initial Access Design for NR_Final, 3rd Generation Partnership Project, vol. RAN WG1, No. Lisbon, Portugal; Oct. 10, 2016-Oct. 14, 2016 Oct. 9, 2016.
Extended European Search Report dated May 13, 2020, issued in European Application No. 17867856.1.
Panasonic, 'NR synchronization signal and DL broadcast signal,' 3GPP TSG RAN WG1 #86bis, R1-1609701, Oct. 10-Oct. 14, 2016.
Panasonic, 'Use of multiple numerologies in NR,' 3GPP TSG RAN WG1 #86, R1-167439, Aug. 22-26, 2016.
Korean Office Action dated Dec. 10, 2021, issued in Korean Application No. 10-2017-0145921.
NTT Docomo, Inc., ,3GPP TSG RAN WG1 Meeting #86, R1-167912, NTT Docomo, Inc., "Discussion on initial access and mobility for NR", Gothenburg, Sweden Aug. 22-26, 2016.
Samsung, 3GPP TSG-RAN WG2 Meeting #95bis, R2-166652, Samsung, "Initial access to support multiple numerologies in NR", Kaohsiung, Taiwan, Oct. 10-14, 2016.
Motorola Mobility ,3GPP TSG RAN WG1 Meeting #86bis, R1-1609917, Motorola Mobility, "Synchronization signal in NR", Lisbon, Portugal, Oct. 10-14, 2016.
NEC,3GPP TSG RAN WG1 Meeting #87, R1-1611716, NEC, "Discussion on PSS/SSS/PBCH in numerology multiplexing", Reno, USA Nov. 14-18, 2016.
Notice of Allowance dated Jul. 28, 2021, issued in Chinese Application No. 202011608626.2.
U.S. Non-Final Office Action dated May 7, 2021, issued in U.S. Appl. No. 1669600.
Huawei et al., "Discussion on UE behavior on mixed numerology carrier," 3GPP TSG RAN WG1 #86bis, R1-1609425, Lisbon, Portugal, Oct. 10-14, 2016.
LG Electronics, "Subframe and mini-subframe definition for frame structure of NR," 3GPP TSG RAN WG1 #86, R1-166881, Gothenburg, Sweden Aug. 22-26, 2016.
Korean Office Action dated Jun. 8, 2022, issued in Korean Application No. 10-2017-0145921.
"Research on NB-IoT Technology in LTE-Advanced Pro," LTE Network Innovation Seminar for 5G (2016), New Application Technology, Kyocera Communications Technology (Guangzhou), a limited company, Guangzhou, Guangdong 510663, p. 136-141, Aug. 17, 2016.
Ericsson, "Broadcasting system information on FeMBMS carrier," 3GPP TSG-RAN WG2 #95bis, R2-166935, Kaohsiung, Taiwan, Oct. 1, 2016.
Notice of Allowance dated Sep. 28, 2022, issued in Chinese Application No. 201780068257.2.

* cited by examiner

FIG. 32

METHOD AND APPARATUS OF FLEXIBLE DATA TRANSMISSIONS AND RECEPTIONS IN NEXT GENERATION CELLULAR NETWORKS

CROSS-REFERENCE TO RELATED APPLICATION(S)

This application is a continuation application of prior application Ser. No. 16/695,966, filed on Nov. 26, 2019, which is a continuation application of prior application Ser. No. 15/801,897, filed on Nov. 2, 2017, which has issued as U.S. Pat. No. 10,499,371 on Dec. 3, 2019 which is based on and claims the benefit under 35 U.S.C. § 119(e) of a U.S. Provisional application filed on Nov. 3, 2016 in the U.S. Patent and Trademark Office and assigned Ser. No. 62/416,941, and U.S. Provisional application filed on Jan. 6, 2017 in the U.S. Patent and Trademark Office and assigned Ser. No. 62/443,278, the entire disclosure of each which is hereby incorporated by reference.

TECHNICAL FIELD

The present disclosure relates to a wireless communication system. More particularly, the present disclosure relates to an apparatus and method for providing flexible data transmissions and receptions in a wireless communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be an example of convergence between the 5G technology and the IoT technology.

In recent years, several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high speed data services, ultra-reliability and low latency applications and massive machine type communication.

The above information is presented as background information only to assist with an understanding of the present disclosure. No determination has been made, and no assertion is made, as to whether any of the above might be applicable as prior art with regard to the present disclosure.

SUMMARY

Due to the widely supported services and various performance requirements, there is high potential that the user equipment (UE) may have different capabilities, e.g., in terms of supported UE bandwidth (BW). Aspects of the present disclosure are to address at least the above-mentioned problems and/or disadvantages and to provide at least the advantages described below. Accordingly, an aspect of the present disclosure is to address the need for flexible UE bandwidth support in the design of 5G network, and the flexible network access for UEs with different bandwidth capabilities.

In accordance with an aspect of the present disclosure, a method for obtaining numerology information by a UE is provided. The method includes detecting synchronization signals, obtaining first numerology information for the synchronization signals, decoding a physical broadcast channel (PBCH) based on the first numerology information, obtaining second numerology information for a physical downlink control channel (PDCCH) according to a result of the decoding, and receiving control information on the PDCCH based on the second numerology information.

The second numerology information indicates a subcarrier spacing for the PDCCH within a subcarrier spacing set. Wherein the subcarrier spacing set is for lower frequency bands or higher frequency bands, the lower frequency bands are below reference frequency band and the higher frequency bands are above the reference frequency band.

The method for the obtaining numerology information by the UE includes obtaining first information on bandwidth for PDCCH transmission according to a result of the decoding.

The method for the obtaining numerology information by the UE includes obtaining second information according to a result of the decoding, the second information including at least one of a candidate physical resource block (PRB) for PDCCH transmission and offset between a center of the PDCCH transmission and a reference frequency.

The method for the obtaining numerology information by the UE includes obtaining third information on a start symbol index to monitor the PDCCH according to a result of the decoding.

In accordance with another aspect of the present disclosure, a method for providing numerology information by a base station in a wireless communication system is provided. The method includes transmitting, to a UE, synchronization signals and first numerology information for the synchronization signals, generating second numerology information for a PDCCH, transmitting, to the UE, the second numerology information on a PBCH based on the first numerology information, and transmitting, to the UE, control information on the PDCCH based on the second numerology information.

The second numerology information indicates a subcarrier spacing for the PDCCH within a subcarrier spacing set. Wherein the subcarrier spacing set is for lower frequency bands or higher frequency bands, the lower frequency bands are below reference frequency band and the higher frequency bands are above the reference frequency band.

The method for providing numerology information by a base station includes generating first information on bandwidth for PDCCH transmission, and transmitting, to the UE, the first information.

The method for providing numerology information by a base station includes generating second information including at least one of a candidate PRB for PDCCH transmission and offset between a center of the PDCCH transmission and a reference frequency, and transmitting, to the UE, the second information.

The method for providing numerology information by a base station includes generating third information on a start symbol index to monitor the PDCCH, and transmitting, to the UE, the third information.

In accordance with another aspect of the present disclosure, a UE for obtaining numerology information in a wireless communication system. The UE includes a transceiver configured to transmit and receive a signal, and a controller coupled with the transceiver and configured to detect synchronization signals, obtain first numerology information for the synchronization signals, decode a PBCH based on the first numerology information, obtain second numerology information for a PDCCH according to a result of the decoding, and receive control information on the PDCCH based on the second numerology information.

In accordance with another aspect of the present disclosure, there is a base station for providing numerology information in a wireless communication system. The base station includes a transceiver configured to transmit and receive a signal, and a controller coupled with the transceiver and configured to transmit, to a UE, synchronization signals and first numerology information for the synchronization signals, generate second numerology information for a PDCCH, transmit, to the UE, the second numerology information on a PBCH based on the first numerology information, and transmit, to the UE, control information on the PDCCH based on the second numerology information.

According to the present disclosure, a method for providing flexible data transmissions and receptions in a wireless communication system is provided. The method provides the flexible network access for UEs with different bandwidth capabilities Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 32 illustrates that the resource element groups (REGs) are indexed in the order of closest subcarrier index first, and then lowest symbol index according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

1) System Operation

Figure 1:
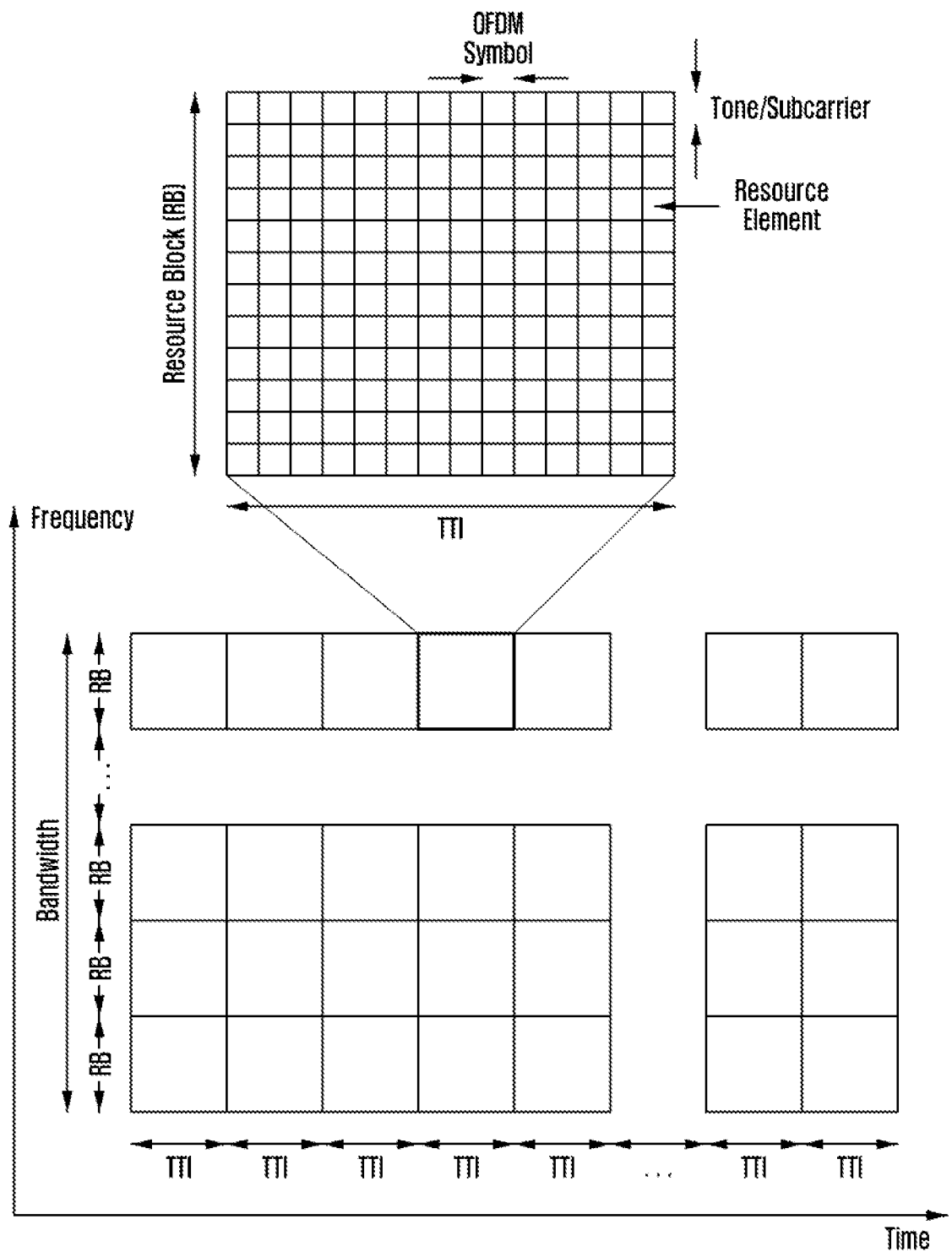
FIG. 1 illustrates resources divided into transmission time intervals (TTIs) in time domain and resource blocks (RBs) in frequency domain according to an embodiment of the present disclosure.

FIG. 1 illustrates resources divided into transmission time intervals (TTIs) in time domain and resource blocks (RBs) in frequency domain according to an embodiment of the present disclosure.

Considering an orthogonal frequency-division multiplexing (OFDM) based communication system, a resource element can be defined by a subcarrier during on OFDM symbol duration. In the time domain, a TTI can be defined which is composed of multiple OFDM symbols. In the frequency domain, a RB can be defined which is composed of multiple OFDM subcarriers.

Referring to FIG. 1, the resources can be divided into TTIs in time domain and RBs in frequency domain. Typically, an RB can be a baseline resource unit for scheduling in the frequency domain, and a TTI can be a baseline resource unit for scheduling in the time domain. Depending on different service features and system requirements, different TTI duration can be used.

Figure 2:
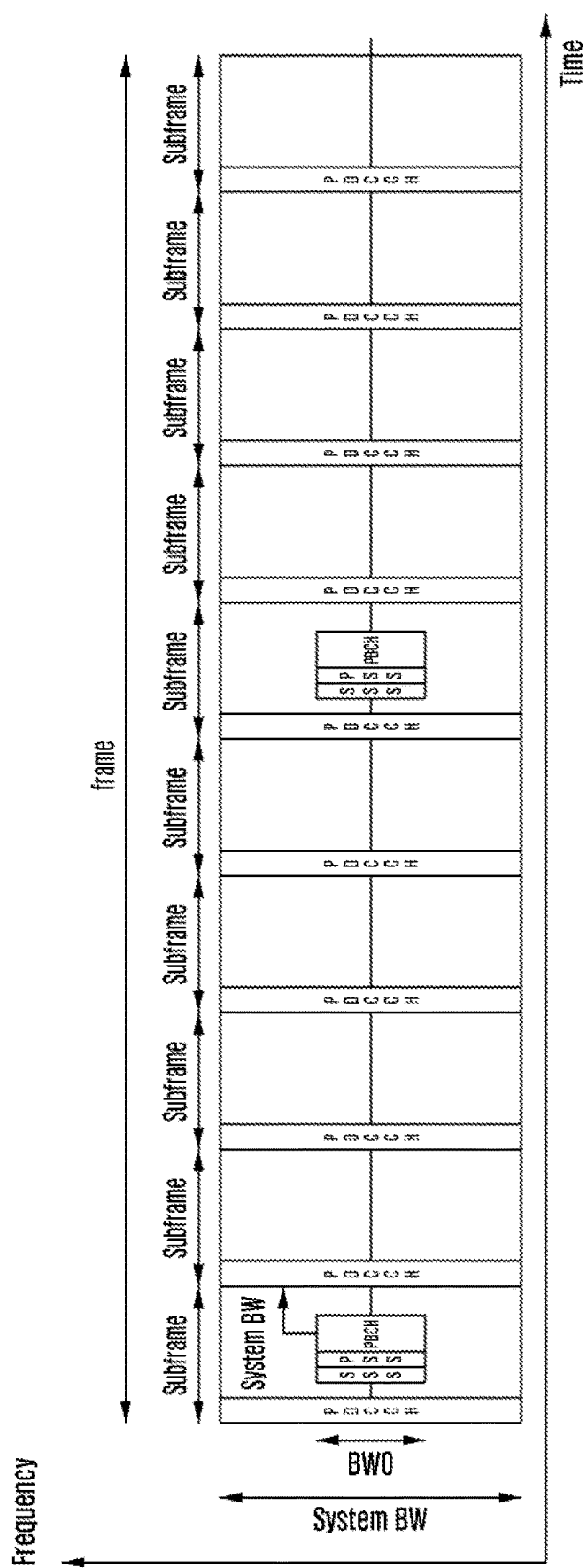
FIG. 2 illustrates an example for transmission of synchronization signals and broadcast channel within a pre-defined bandwidth according to an embodiment of the present disclosure.

FIG. 2 illustrates an example for transmission of synchronization signals and broadcast channel within a pre-defined bandwidth according to an embodiment of the present disclosure.

In the fourth generation (4G) long term evolution (LTE) networks, flexible system bandwidth is supported (e.g., 1.4 MHz/3 MHz/5 MHz/10 MHz/15 MHz/20 MHz), and the channel designs are mostly based on the operated system bandwidth. This gives mandatory requirement that the UE should operate in the same bandwidth with the system, except in initial access when UE has no information of the system bandwidth. Since the UEs have no information of the system bandwidth in the initial access, the essential signals and channels are transmitted based on a pre-defined bandwidth, e.g., the minimum bandwidth supported by the networks.

Referring to FIG. 2, the transmission of the synchronization signals (e.g., primary synchronization signal (PSS) and secondary synchronization signal (SSS)) and broadcast channel (e.g., physical broadcast channel (PBCH)) is limited within a pre-defined bandwidth BW0 in the center of the system bandwidth, which is accessible to all UEs. After receiving the PBCH, it is possible that the UEs obtain the system bandwidth, e.g., indicated in the master information block (MIB) carried by PBCH. Then it is possible that the transmissions of other channels/signals occupy the full system bandwidth, because the UEs can access the actual system bandwidth after obtaining the system bandwidth information.

For the UEs with less bandwidth than the system bandwidth, it is impossible for the UEs to access the channel which occupies full system bandwidth, e.g., enhanced machine type communication (eMTC) and narrowband internet-of-things (NB-IoT). There is limitation of the current systems to support flexible access for UEs with various bandwidths.

In the future cellular networks, there is a need to multiplex different services, which may require different numerologies due to the various performance requirements. Assuming the LTE numerology as a baseline, e.g., subcarrier spacing of 15 kHz, the scaled LTE numerology can be considered to support diverse services, e.g., 30 kHz, 60 kHz, and so on. In addition, it is possible that the UEs may support flexible bandwidth. In the present disclosure, the methods of flexible control channel design are proposed for the future cellular networks, e.g., LTE-advanced (LTE-A) or fifth generation (5G).

Figure 3:
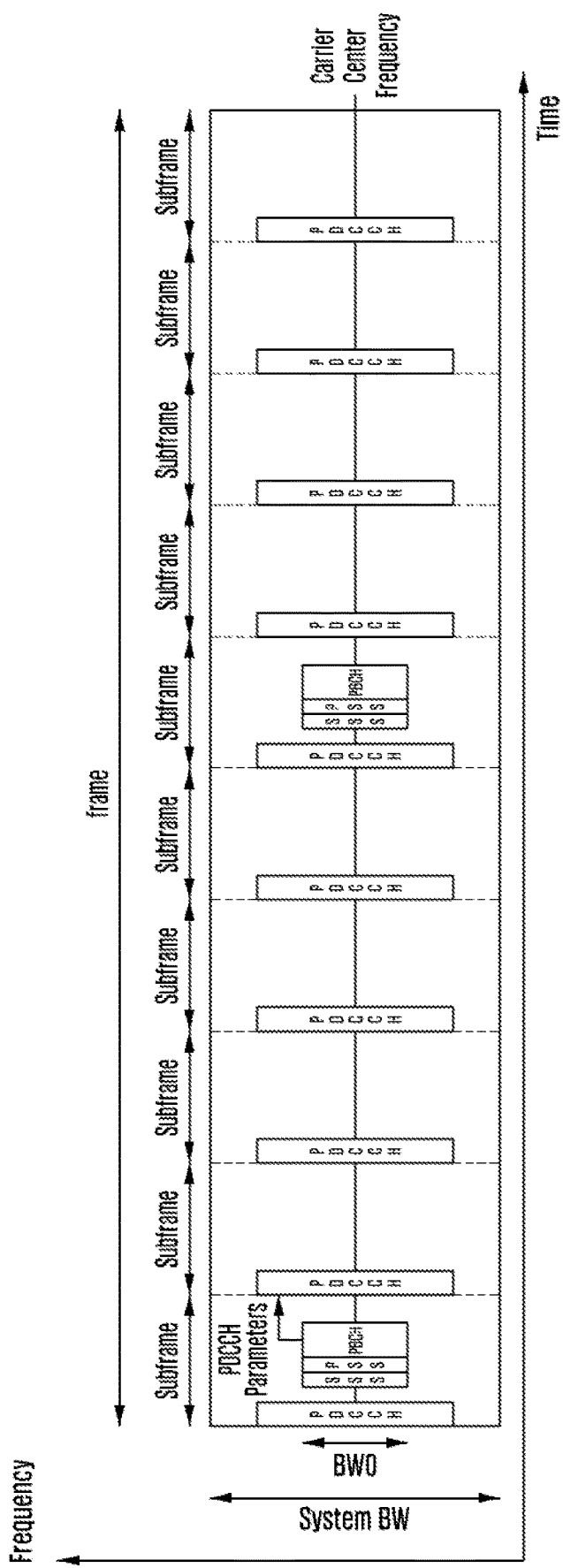
FIG. 3 illustrates an example for transmission of synchronization signals and broadcast channel within a pre-defined bandwidth according to an embodiment of the present disclosure.

FIG. 3 illustrates an example for transmission of synchronization signals and broadcast channel within a pre-defined bandwidth according to an embodiment of the present disclosure.

Considering that the UEs may have different bandwidth, the downlink signals and channels need to be designed to support various UEs with flexible bandwidth. The essential signals and channels can be designed based on a pre-defined bandwidth, e.g., the minimum bandwidth supported by the UEs, or minimum bandwidth supported by the UEs targeted to a certain service.

Referring to FIG. 3, the transmission of the synchronization signals (e.g., PSS and SSS) and broadcast channel (e.g., PBCH) is limited within a bandwidth BW0. Since the UEs have no information of the system bandwidth in the initial access, the UEs search the synchronization signals with the bandwidth BW0.

After synchronization is detected, the PBCH can be received in the same bandwidth BW0. After receiving the PBCH, it is possible that the UEs obtain the system bandwidth, e.g., indicated in the MIB carried by PBCH. The numerology used by the physical downlink control channel (PDCCH) may be different from that for synchronization and PBCH transmission, the related parameters (e.g., subcarrier spacing, CP pattern) can be indicated in the MIB.

In addition, since the UEs have different capabilities in terms of supported bandwidth, not all UEs can receive the signals in the full system bandwidth. Depending on the bandwidth options supported by the UEs, the PDCCH may not occupy the full system bandwidth. Even though the PDCCH transmission occupies the whole system bandwidth, for the UEs which have a bandwidth less than the system bandwidth, it is possible to allow the UEs to decode PDCCH within its supported bandwidth.

2) Resource Block (RB) Grid

Figure 4:
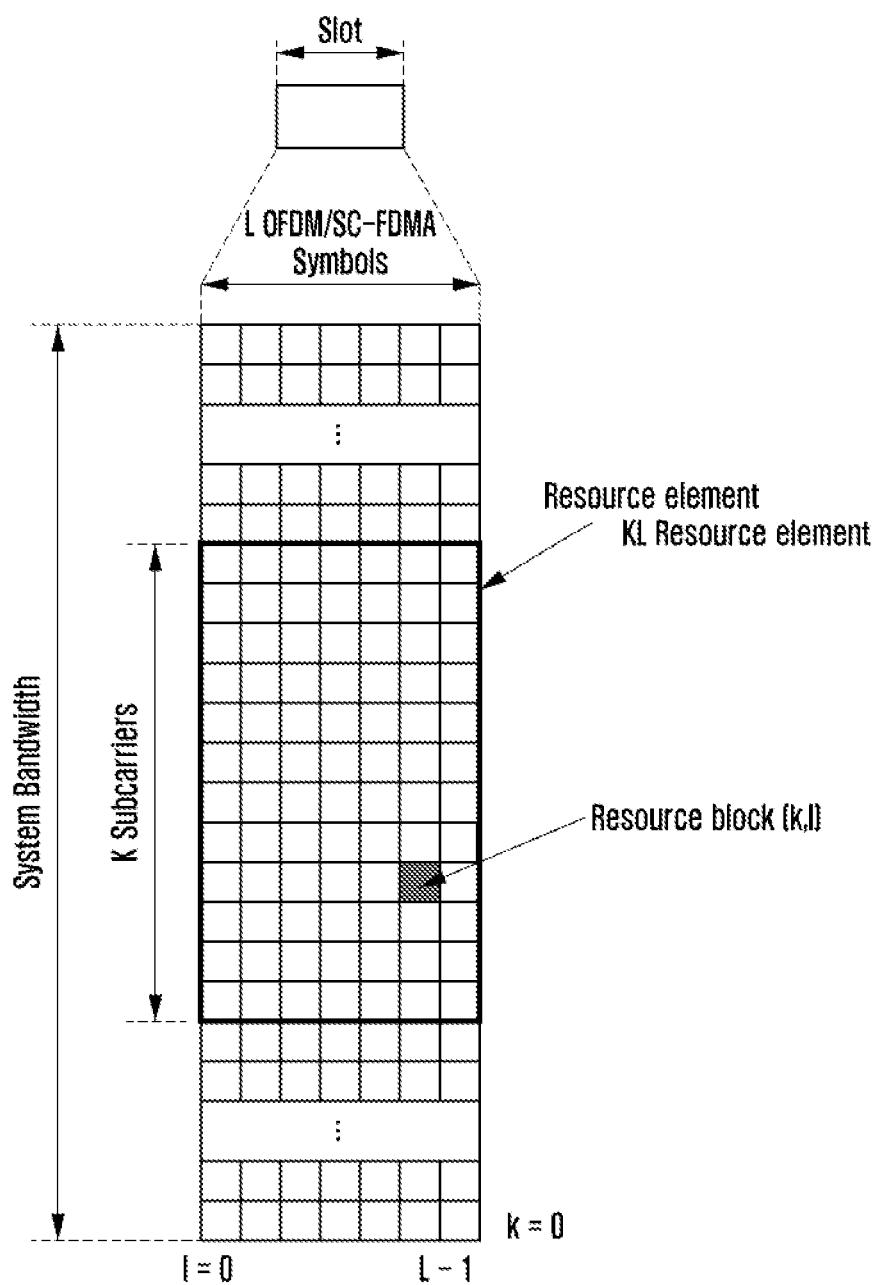
FIG. 4 illustrates a resource grid in time and frequency domain according to an embodiment of the present disclosure.

FIG. 4 illustrates a resource grid in time and frequency domain according to an embodiment of the present disclosure.

Give a certain system bandwidth, there is a need to define the RB in terms of time/frequency resources. Generally, given a transmission bandwidth $B_{TX}$, there are an integer number of subcarriers, e.g., $N_{sc}^{Total}$. The number of available subcarriers may depend on the subcarrier spacing $\Delta f$. It may be assumed that the system supports multiple subcarrier spacing values, e.g., $\Delta f_0$, $\Delta f_1$, $\Delta f_2$, $\Delta f_3$, . . . , $\Delta f_{N-1}$, the number of available subcarriers when using the subcarrier spacing $\Delta f_n$ (0≤n<N−1) can be expressed by $$N_{sc}^{Total} = \left\lfloor \frac{B_{TX}}{\Delta f_n} \right\rfloor.$$

An RB is described by K subcarriers and L OFDM/SC-FDMA symbols.

Referring to FIG. 4, an example of the resource grid is illustrated. The number of RBs $N_{RB}$ depends on the transmission bandwidth and used subcarrier spacing $\Delta f_n$ configured in the cell. In most cases the number of subcarriers per RB can be pre-defined, e.g., K=12. There are also cases that the number of subcarriers can be less than K. The number of OFDM/SC-FDMA symbols in a slot may depend on the cyclic prefix length configured in the system. Each element in the resource grid is called a resource element and is uniquely defined by the index pair (k, l) in a slot where k=0, . . . $N_{sc}^{Total}$−1 and l=0, . . . , L−1 are the indices in the frequency and time domains, respectively.

Figure 5:
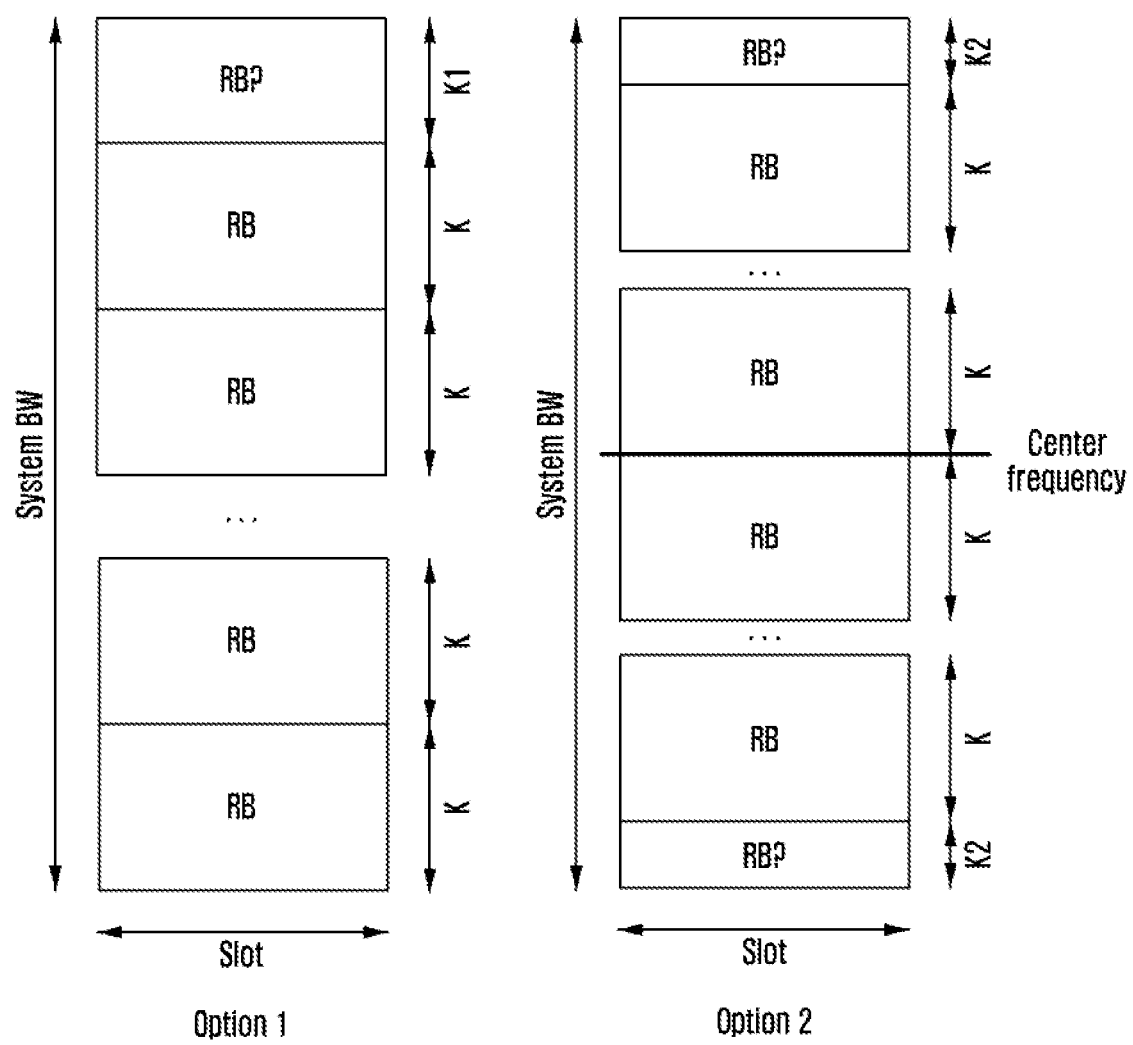
FIG. 5 illustrates an RB grid defined according to embodiments of the present disclosure.

FIG. 5 illustrates an RB grid defined according to embodiments of the present disclosure.

Several ways can be considered to define the RB grid.

Option 1: The RB grid is defined from one side of the system bandwidth. That means the RB boundary is always aligned with the edge of one side in the system bandwidth. The system bandwidth here may also mean the actual transmission bandwidth, assuming some guardband is used in the edge of the system bandwidth.

Without loss of generality, the RB can be mapped from the lower frequency side. This means the RB boundary is aligned with the lower frequency side.

Referring to FIG. 5, the first RB is composed of the subcarriers 0 to K−1, and the second RB is composed of the subcarriers K to 2K−1, and so forth. Thus, there are at least $$M = \left\lfloor \frac{N_{sc}^{Total}}{K} \right\rfloor$$

RBs with size of K subcarrier. It is possible that there may be a number of subcarriers remained in the edge side, i.e., $K_1 = N_{sc}^{Total} = \mod(N_{sc}^{Total}, K)$. If $K_1=0$, the system bandwidth fits with an integer number (i.e., M) of RBs with size of K subcarriers. If $K_1>0$, there can be different approaches to handle the remaining $K_1$ subcarriers:

Option 1-1: The remaining $K_1$ subcarriers are always counted as one RB, which means there are total M+1 RBs in the system bandwidth. There are M RBs with size of K subcarriers, and 1 RB with size of $K_1$ subcarriers.

Option 1-2: The remaining $K_1$ subcarriers are always discarded and not counted as one RB, which means there are total M RBs in the system bandwidth, with size of K subcarriers.

Option 1-3: For different numerology case, whether to count the remaining $K_1$ subcarriers as one RB can be different. For different numerology cases, the RB size is different from each other. For example, the RB size with 12 subcarriers are 180 kHz, 360 kHz, 720 kHz, 1440 kHz, respectively for the subcarrier spacing of 15 kHz, 30 kHz, 60 kHz, 120 kHz. With different amount of resources per RB for different numerologies, different operation can be used for different numerology cases. For example, when the subcarrier spacing is larger than a predefined value, i.e., larger RB size case, Option 1-1 is used. Otherwise for smaller subcarrier spacing, i.e., smaller RB size case, Option 1-2 is used.

Option 1-4: There can be an indication signaled in the system information, to inform UEs if to count the remaining $K_1$ subcarriers (if any) as one RB or not, i.e., Option 1-1 or Option 1-2. Based on the indication, the UE can determine the RB grid mapping for the remaining less than K subcarrier if any. Similarly, the indication can be applied to all numerology cases. It is also possible to have numerology specific indication. It is also possible to indicate a certain numerology (subcarrier spacing) value, the operation can be different for the case that subcarrier spacing larger than the indicated value, and the case that subcarrier spacing smaller than the indicated value. For example, when the subcarrier spacing is larger than the indicated value (larger RB size), Option 1-1 is used. Otherwise, for smaller subcarrier spacing (smaller RB size), Option 1-2 is used.

Option 1-5: There can be a pre-defined condition or rule to determine if the remaining $K_1$ subcarriers can be counted as one RB. For example, if Klis larger than or equal to a pre-defined threshold Y $$\left(\text{e.g., } Y = \frac{K}{2}\right),$$

the remaining $K_1$ subcarriers are counted as one RB. Otherwise, they are discarded and not counted as one RB. In case that $K_1$ is larger than or equal to a pre-defined threshold Y, it is also possible that only the first Y subcarriers are counted as one RB and remaining $K_1-Y$ subcarriers are not used or counted, rather than make an RB with arbitrary number of subcarriers. This ensures that the smaller RB in the edge side (if present) always has a fixed size (i.e., Y subcarriers) for a given numerology. The pre-defined threshold can be the same for all numerology cases. Alternatively, the pre-defined threshold can be different for different numerology cases.

Option 1-6: The basic operation is similar as that in Option 1-5, i.e., but the threshold Y can be configured in the system, e.g., signaled in the system information. Based on the configured value, the UE can determine the RB grid mapping for the remaining less than K subcarrier if any. Similarly, the range of the threshold configurations can be different for different numerology cases.

Option 2: The RB grid is defined from the center of the system bandwidth. That means the RB boundary is always aligned with the center in the system bandwidth. The system bandwidth here may also mean the actual transmission bandwidth, assuming some guardband is used in the edge of the system bandwidth.

The RB can be mapped from the center of the system bandwidth. This means the RB boundary is aligned with the center of the system bandwidth. For example, in the lower frequency side half system bandwidth, there are subcarriers 0 to $$\left\lfloor \frac{N_{sc}^{Total}}{2} \right\rfloor - 1.$$

In the higher frequency side half system bandwidth, there are subcarriers $$\left\lfloor \frac{N_{sc}^{Total}}{2} \right\rfloor$$

to $N_{sc}^{Total}-1$. The RBs are counted from the center to both sides. As shown in FIG. 2B, in the higher frequency side half system bandwidth, one RB is composed of the subcarriers $$\left\lfloor \frac{N_{sc}^{Total}}{2} \right\rfloor \text{ to } \left\lfloor \frac{N_{sc}^{Total}}{2} \right\rfloor + K - 1,$$

and the next RB is composed of the subcarriers $$\left\lfloor \frac{N_{sc}^{Total}}{2} \right\rfloor + K \text{ to } \left\lfloor \frac{N_{sc}^{Total}}{2} \right\rfloor + 2K - 1,$$

and so forth. Similarly, in the lower frequency side half system bandwidth, one RB is composed of the subcarriers $$\left\lfloor \frac{N_{sc}^{Total}}{2} \right\rfloor - K \text{ to } \left\lfloor \frac{N_{sc}^{Total}}{2} \right\rfloor - 1,$$

and the next RB is composed of the subcarriers $$\left\lfloor \frac{N_{sc}^{Total}}{2} \right\rfloor - 2K \text{ to } \left\lfloor \frac{N_{sc}^{Total}}{2} \right\rfloor - K - 1,$$

and so forth. Thus, there are at least $$M = 2\left\lfloor \frac{N_{sc}^{Total}}{2K} \right\rfloor$$

RBs with size of K subcarrier. It is possible that there may be a number of subcarriers remained in the edge of both sides, i.e., $$K_2 = \text{mod}\left(\left\lfloor \frac{N_{sc}^{Total}}{2} \right\rfloor, K\right).$$

If $K_2=0$, the system bandwidth is fit with an integer number (i.e., M) of RBs with size of K subcarriers. If $K_2>0$, there can be different approaches to handle the remaining $K_2$ subcarriers:

Option 2-1: In both edge sides, the remaining $K_2$ subcarriers are always counted as one RB, which means there are total M+2 RBs in the system bandwidth. There are M RBs with size of K subcarriers, and 2 RBs with size of $K_2$ subcarriers.

Option 2-2: In both edge sides, the remaining $K_2$ subcarriers are always discarded and not counted as one RB, which means there are total M RBs in the system bandwidth, with size of K subcarriers.

Option 2-3: For different numerology case, whether to count the remaining $K_2$ subcarriers as one RB can be different. For different numerology cases, the RB size is different from each other. For example, the RB size with 12 subcarriers are 180 kHz, 360 kHz, 720 kHz, 1440 kHz, respectively for the subcarrier spacing of 15 kHz, 30 kHz, 60 kHz, 120 kHz. With different amount of resources per RB for different numerologies, different operation can be used for different numerology cases. For example, when the subcarrier spacing is larger than a predefined value, i.e., larger RB size case, Option 2-1 is used. Otherwise for smaller subcarrier spacing, i.e., smaller RB size case, Option 2-2 is used.

Option 2-4: There can be an indication signaled in the system information, to inform UEs if to count the remaining $K_2$ subcarriers (if any) as one RB or not, i.e., Option 2-1 or Option 2-2. Based on the indication, the UE can determine the RB grid mapping for the remaining less than K subcarrier if any. Similarly, the indication can be applied to all numerology cases. It is also possible to have numerology specific indication. It is also possible to indicate a certain numerology (subcarrier spacing) value, the operation can be different for the case that subcarrier spacing larger than the indicated value, and the case that subcarrier spacing smaller than the indicated value. For example, when the subcarrier spacing is larger than the indicated value (larger RB size), Option 2-1 is used. Otherwise, for smaller subcarrier spacing (smaller RB size), Option 2-2 is used.

Option 2-5: There can be a pre-defined condition or rule to determine if the remaining $K_2$ subcarriers can be counted as one RB. For example, if $K_2$ is larger than or equal to a pre-defined threshold Y $$\left(\text{e.g., } Y = \frac{K}{2}\right),$$

the remaining $K_2$ subcarriers are counted as one RB. Otherwise, they are discarded and not counted as one RB. In case that $K_2$ is larger than or equal to a pre-defined threshold Y, it is also possible that only the first Y subcarriers are counted as one RB and remaining $K_{2-Y}$ subcarriers are not used or counted, rather than make an RB with arbitrary number of subcarriers. This ensures that the smaller RB in the edge side (if present) always has a fixed size (i.e., Y subcarriers) for a given numerology. The pre-defined threshold can be the same for all numerology cases. Alternatively, the pre-defined threshold can be different for different numerology cases.

Option 2-6: The basic operation is similar as that in Option 2-5, i.e., but the threshold Y can be configured in the system, e.g., signaled in the system information. Based on the configured value, the UE can determine the RB grid mapping for the remaining less than K subcarrier if any. Similarly, the range of the threshold configurations can be different for different numerology cases.

Figure 6:
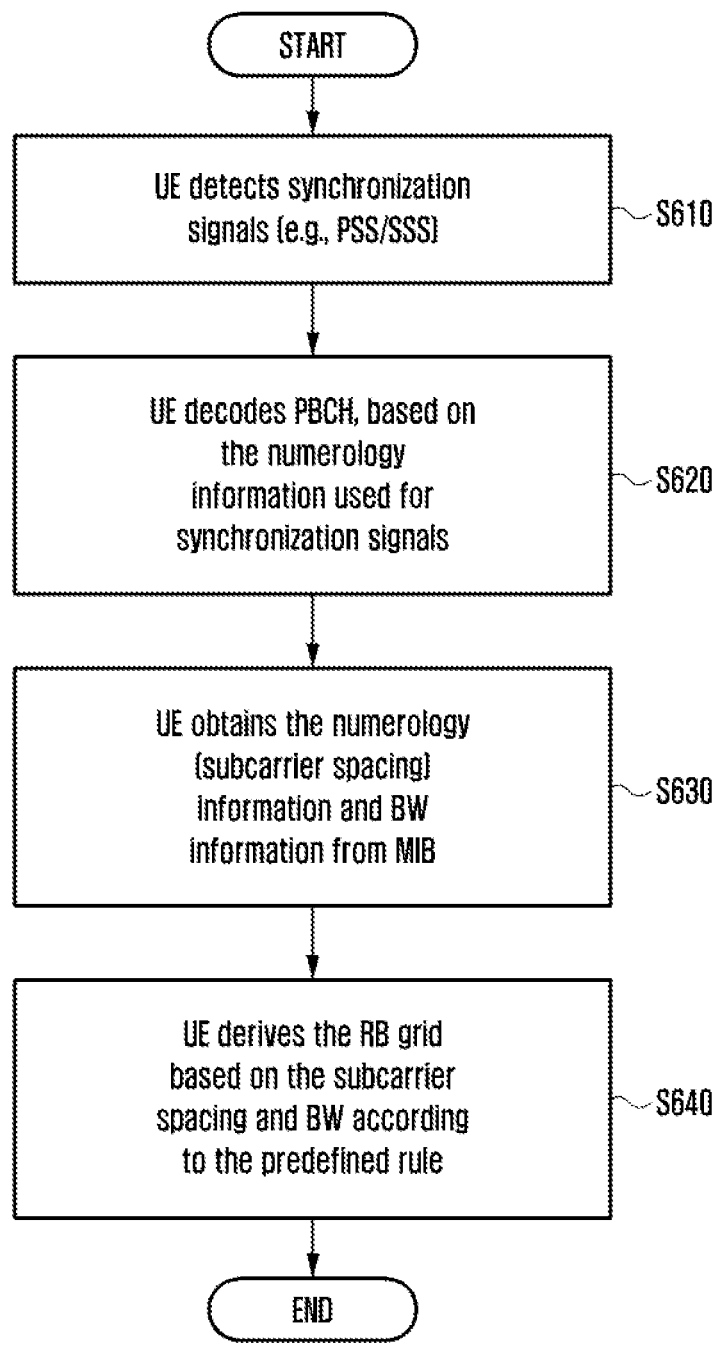
FIG. 6 illustrates a flowchart for determining an RB grid by a user equipment (UE) according to an embodiment of the present disclosure.

FIG. 6 illustrates a flowchart for determining an RB grid by a UE according to an embodiment of the present disclosure.

Referring to FIG. 6, the UE's behavior to determine the RB grid is illustrated, at the stage when the UE connects to the system. UEs first detect synchronization signals in operation S610, and then decode PBCH in operation S620. The numerology for monitoring PDCCH can be the same as that of PBCH, or can be indicated in the MIB. Based on the numerology and system bandwidth information signaled in the MIB, which is obtained by the UE in operation S630, the UEs derive the RB grid structure based on the pre-defined rule in operation S640. The next-generation Node B (gNB) can configure UE-specific numerology. After receiving the configured numerology, the UE needs to derive the RB grid based on the configured numerology.

Figure 7:
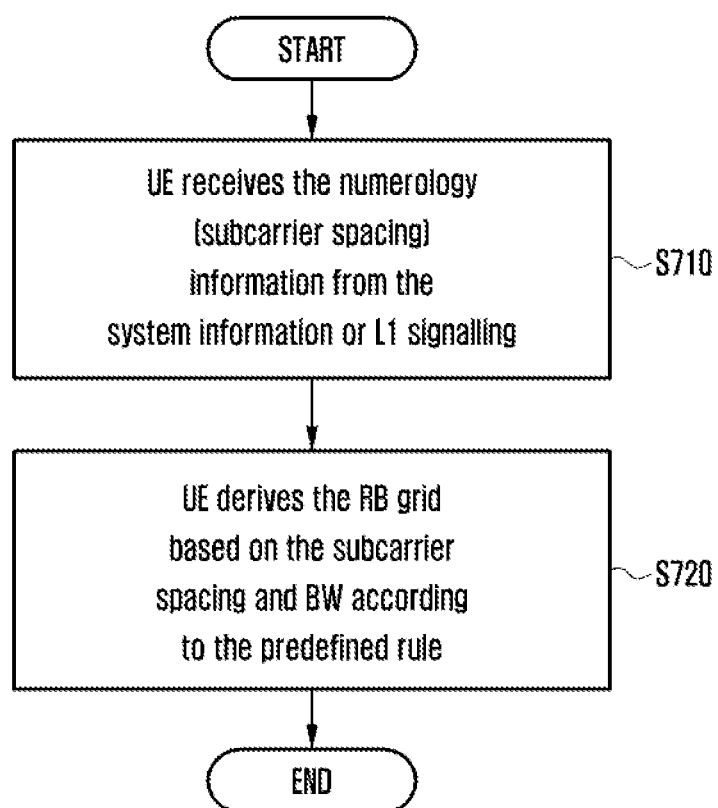
FIG. 7 illustrates a flowchart for determining an RB grid by a UE based on configured numerology according to an embodiment of the present disclosure.

FIG. 7 illustrates a flowchart for determining an RB grid by a UE based on configured numerology according to an embodiment of the present disclosure.

Referring to FIG. 7, the UE's behavior to determine the RB grid based on configured numerology is illustrated. The UE receives the numerology information (subcarrier spacing) from the system information or L1 signaling in operation S710. The UE derives the RB grid based on the subcarrier spacing and BW according to the predefined rule in operation S720.

Figure 8:
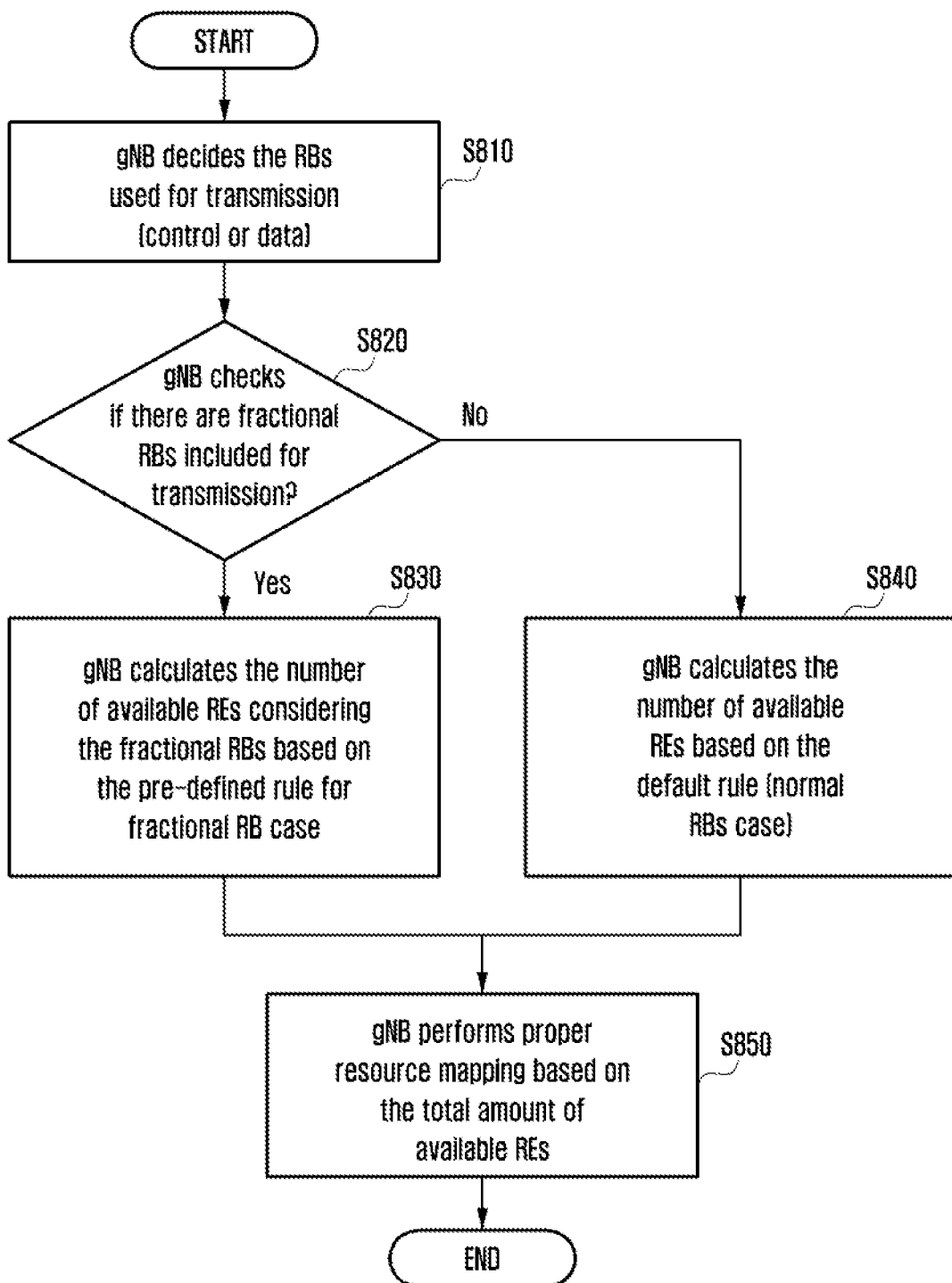
FIG. 8 illustrates a flowchart for mapping resources by a base station according to an embodiment of the present disclosure.

FIG. 8 illustrates a flowchart for mapping resources by a base station according to an embodiment of the present disclosure.

Referring to FIG. 8, the gNB (or base station) decides the RBs used for transmission (control or data) in operation S810. The gNB checks if there are fractional RBs included for transmission in operation S820. If there are fractional RBs included for transmission, the gNB calculates the number of available REs considering the fractional RBs based on the pre-defined rule for fractional RB case in operation S830. If there are not fractional RBs included for transmission, the gNB calculates the number of available REs based on the default rule (normal RBs case) in operation S840. The gNB performs proper resource mapping based on the total amount of available REs in operation S850.

Figure 9:
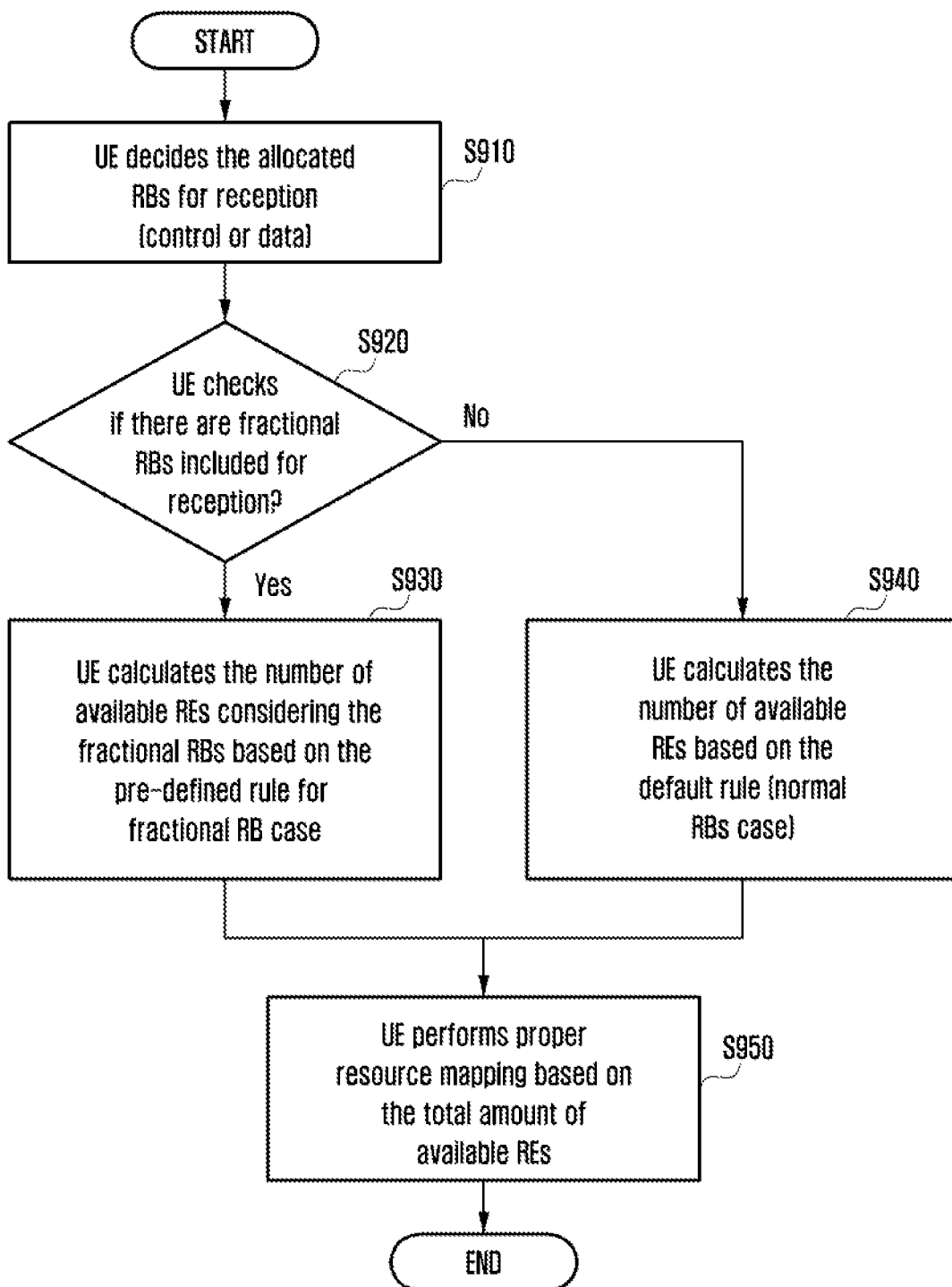
FIG. 9 illustrates a flowchart for mapping resources by a UE according to an embodiment of the present disclosure.

FIG. 9 illustrates a flowchart for mapping resources by a UE according to an embodiment of the present disclosure.

Referring to FIG. 9, the UE decides the allocated RBs for reception (control or data) in operation S910. The UE checks if there are fractional RBs included for reception in operation S920. If there are fractional RBs included for reception, the UE calculates the number of available REs considering the fractional RBs based on the pre-defined rule for fractional RB case in operation S930. If there are not fractional RBs included for reception, the UE calculates the number of available REs based on the default rule (normal RBs case) in operation S940. The UE performs proper resource mapping based on the total amount of available REs in operation S950.

If the fractional RBs (RB with a size less than the full size RB) exist in the edge side of a given system bandwidth under a certain numerology, the gNB needs to consider the actual number of available REs when the fractional RBs are used for control channel or data channel transmission. In FIG. 8 and FIG. 9, the gNB's and UE's behaviors are illustrated respectively.

3) Physical Downlink Control Channel (PDCCH) Design

Figure 10:
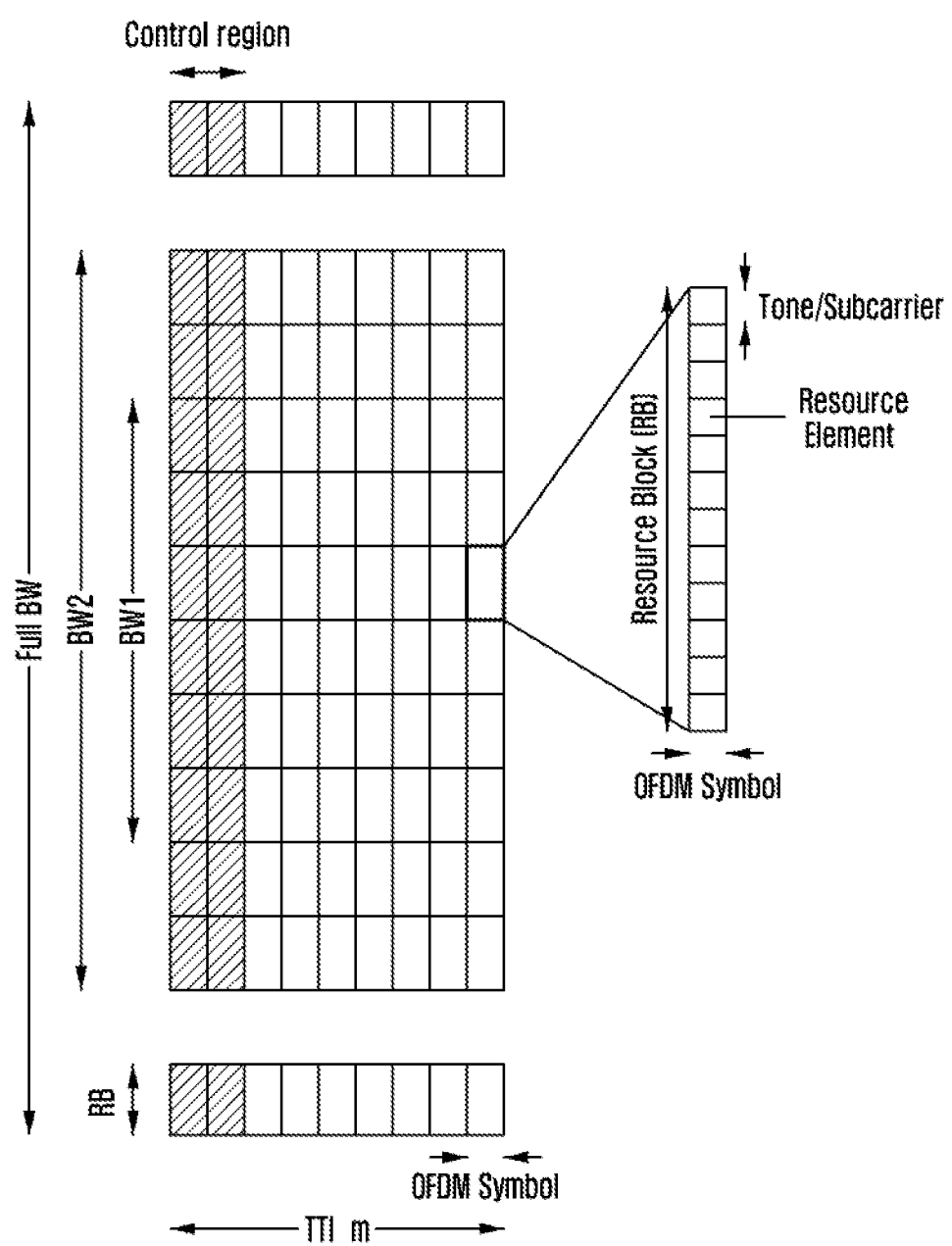
FIG. 10 illustrates an example for UEs with different bandwidth capabilities according to an embodiment of the present disclosure.

FIG. 10 illustrates an example for UEs with different bandwidth capabilities according to an embodiment of the present disclosure.

Given a PDCCH transmission BW, it is possible that the UEs with different BW can decode the PDCCH by receiving a portion of PDCCH, e.g., a portion corresponding to the UE's BW.

Referring to FIG. 10, assuming that the control channel (PDCCH) is transmitted in the full BW, the UEs which have a BW less than the full BW, e.g., BW1, BW2, can decode the PDCCH by receiving the PDCCH portion within BW1 or BW2. The PDCCH may occupy one or multiple OFDM symbols, e.g., 1, 2, or 3.

The PDCCH may include multiple control subbands in the frequency domain. The size of a subband may depend on several parameters, e.g., the minimum UE BW, the system bandwidth case, the reference numerology used in the cell, and the frequency band case. It is possible that there are different subband sizes in the same cell.

To support different UE BW cases, there can be a common control subband which is accessible to all the UEs before connection to the network. The size of the common control subband may depend on the minimum UE BW, the system bandwidth, the reference numerology used in the cell, and the frequency band case. The common control subband may convey the essential system information, the control channel parameters, and control information of system information, paging, and random access. The common control subband can be the default control channel for UEs in idle mode to monitor the control channel. After the UE is connected to the system, the gNB can configure a UE-specific control sub-band to UE for PDCCH monitoring.

Figure 11:
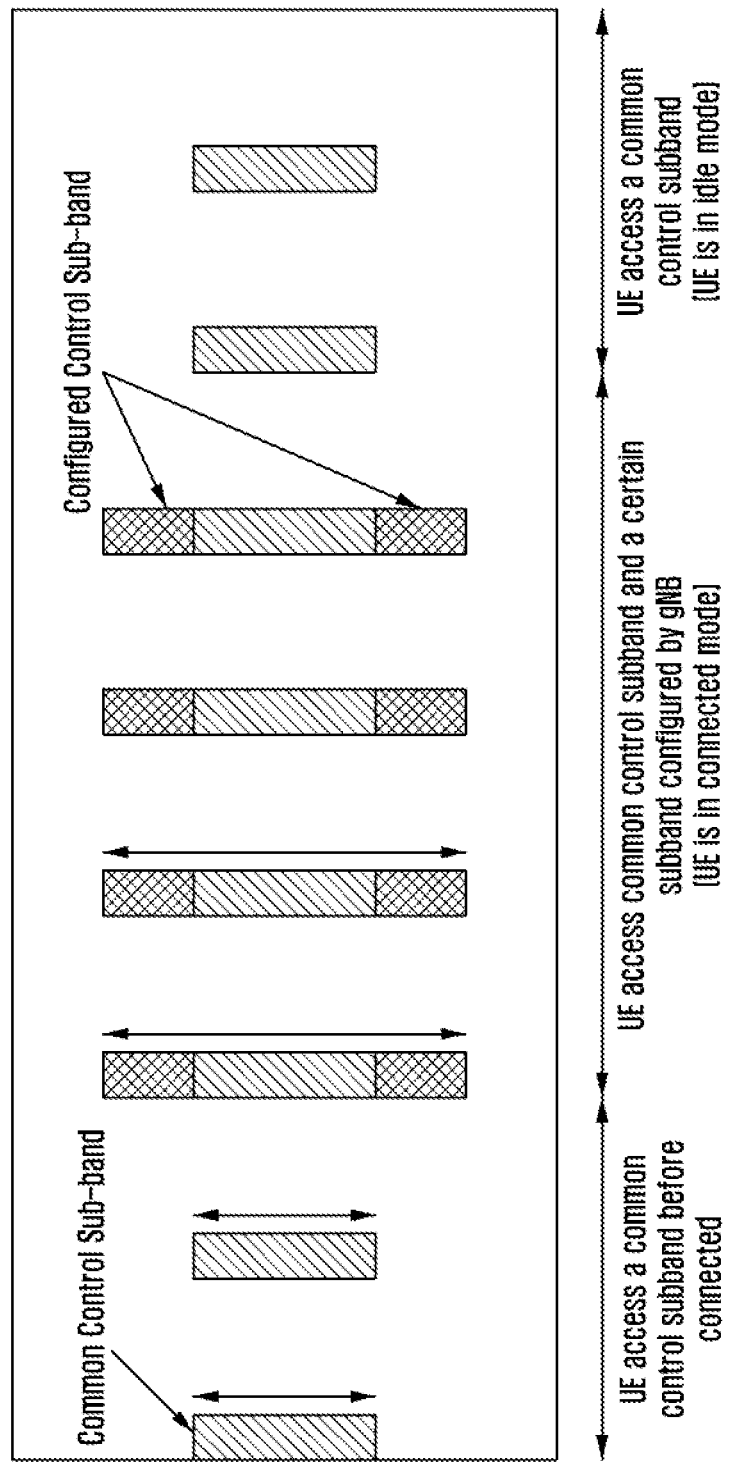
FIG. 11 illustrates an example for a control subband according to an embodiment of the present disclosure.

FIG. 11 illustrates an example for a control subband according to an embodiment of the present disclosure.

Referring to FIG. 11, a control subband may include the common control subband. If configured, the UE may monitor the configured control subband including the common control subband as well. It is also possible that a control subband does not overlap with the common control subband.

Figure 12:
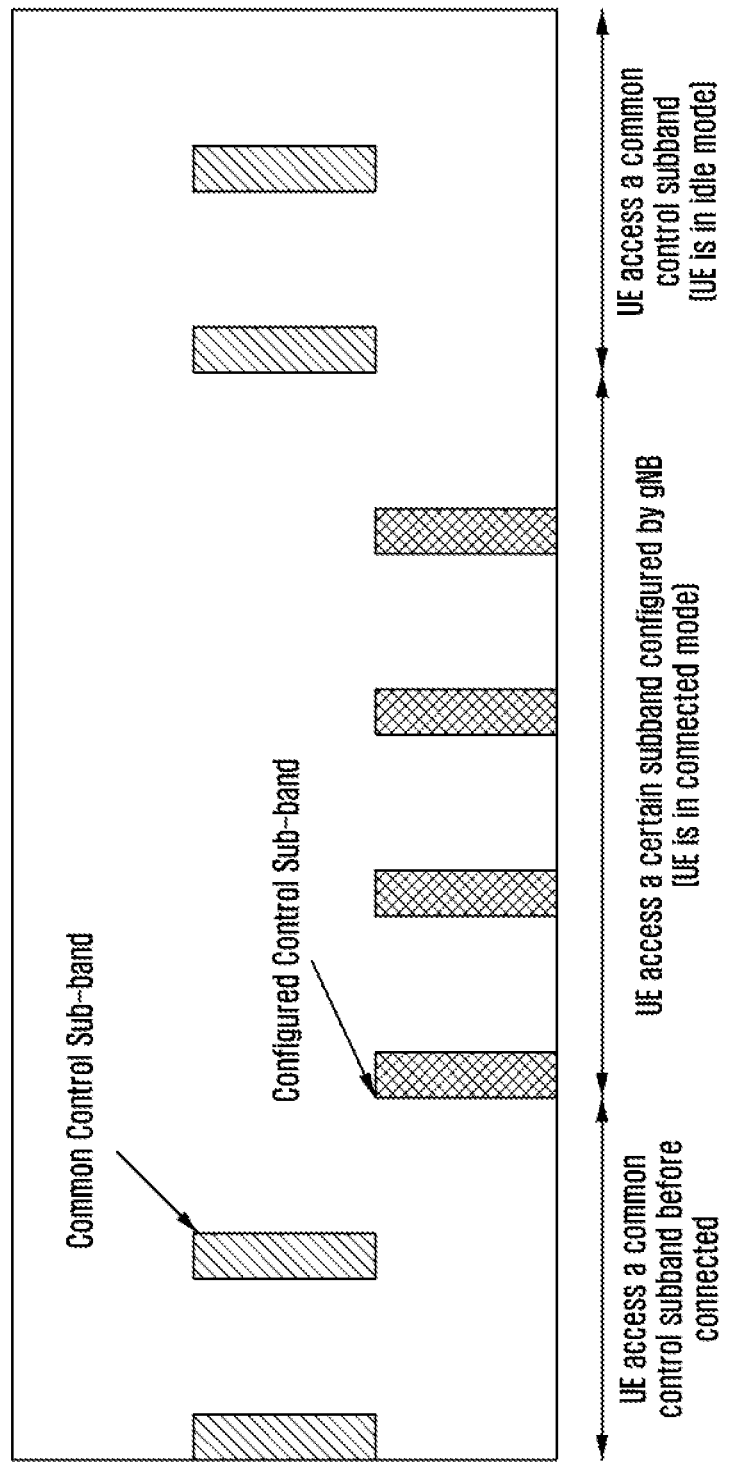
FIG. 12 illustrates an example for a control subband according to another embodiment of the present disclosure.

FIG. 12 illustrates an example for a control subband according to another embodiment of the present disclosure.

Referring to FIG. 12, the configured control subband may occupy a number of contiguous physical resource blocks (PRBs) in the frequency domain and not overlap with the common control subband. If configured, the UE may only monitor the configured control subband.

Figure 13A:
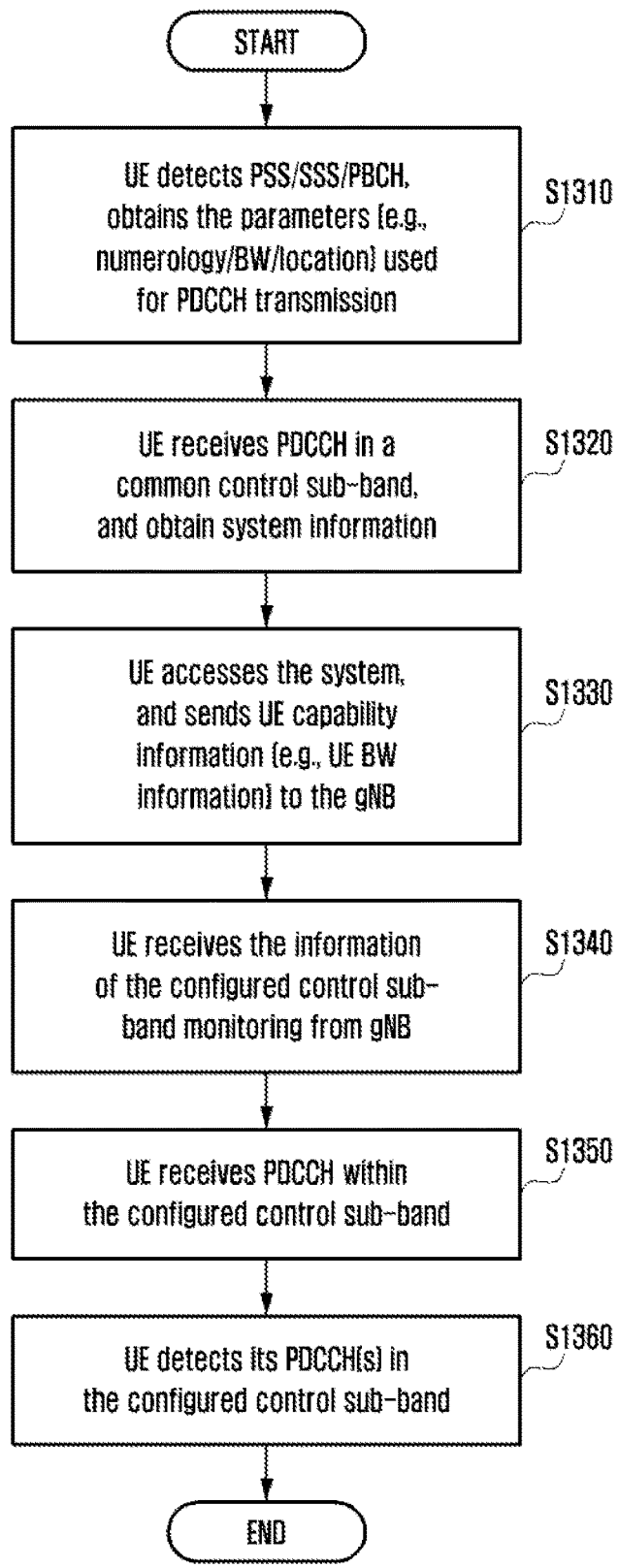
FIG. 13A illustrates a flowchart for receiving physical downlink control channel (PDCCH) by a UE according to an embodiment of the present disclosure.
Figure 13B:
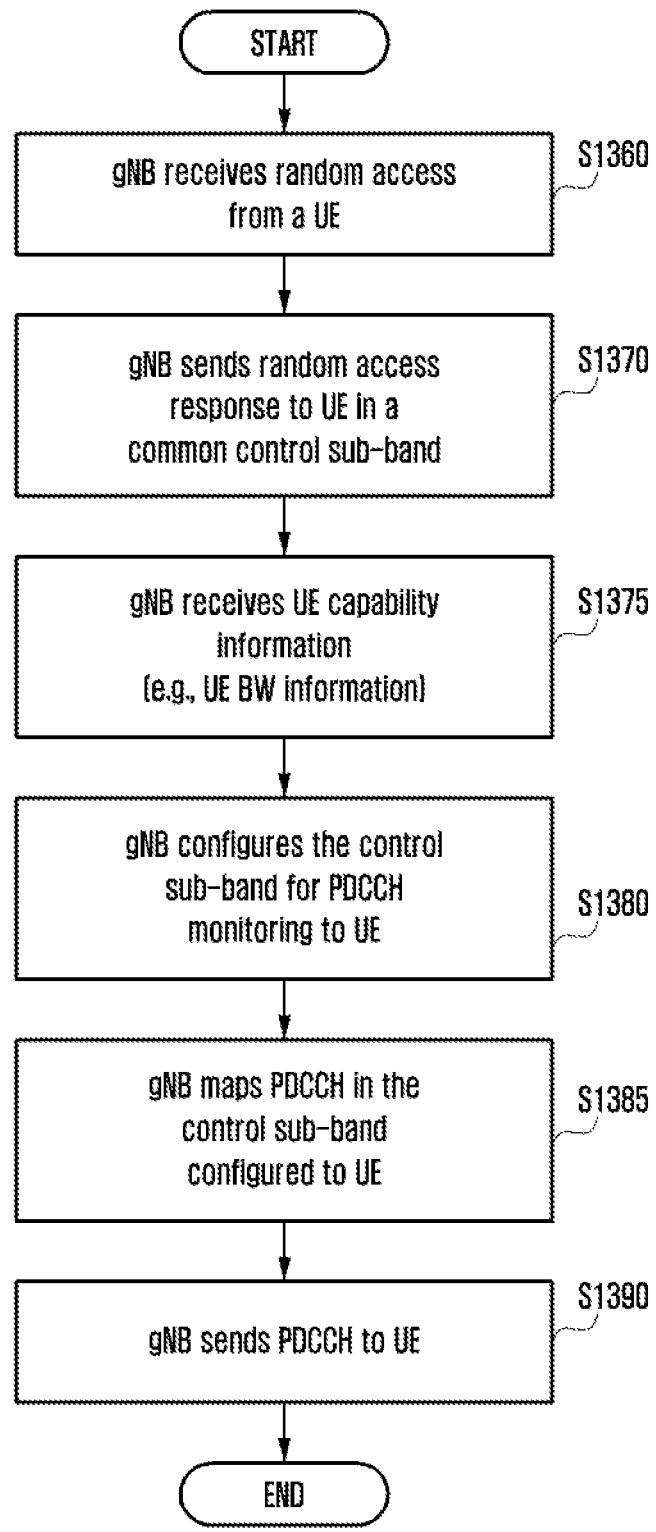
FIG. 13B illustrates a flowchart for transmitting PDCCH by a base station according to an embodiment of the present disclosure.

In FIG. 13A and FIG. 13B, a flowchart of UE behavior to receive PDCCH and gNB behavior to transmit PDCCH is illustrated.

FIG. 13A illustrates a flowchart for receiving PDCCH by a UE according to an embodiment of the present disclosure.

Referring to FIG. 13A, a UE detects PSS/SSS/PBCH and obtains the parameters (e.g., numerology/BW/location) used for PDCCH transmission in operation S1310. The UE receives PDCCH in a common control sub-band, and obtains system information in operation S1320. The UE accesses the system and sends UE capability information (e.g., UE BW information) to the gNB in operation S1330. The UE receives the information of the configured control sub-band monitoring from gNB in operation S1340. The UE receives PDCCH within the configured control sub-band in operation S1350. The UE detects its PDCCH(s) in the configured control sub-band in operation S1360.

FIG. 13B illustrates a flowchart for transmitting PDCCH by a base station according to an embodiment of the present disclosure.

Referring to FIG. 13B, a gNB (or a base station) receives random access from a UE in operation S1360. The gNB sends random access response to UE in a common control sub-band in operation S1370. The gNB receives UE capability information (e.g., UE BW information) in operation S1375. The gNB configures the control sub-band for PDCCH monitoring to UE in operation S1380. The gNB maps PDCCH in the control sub-band configured to UE in operation S1385. The gNB sends PDCCH to the UE in operation S1390.

4) Physical Downlink Control Channel (PDCCH) Numerology Indication

It may be assumed that the system supports multiple subcarrier spacing values, e.g., $\Delta f_0, \Delta f_1, \Delta f_2, \Delta f_3, \ldots, \Delta f_{N-1}$ (where $\Delta f_n < \Delta f_{n+1}$, $0 \leq n < N-1$); the usage of certain subcarrier spacing may depend on the service and system requirement. To reduce the complexity in the initial access, the subcarrier spacing for synchronization and PBCH transmission can be pre-defined or selected by the gNB from the full set or a subset of the supported subcarrier spacing values. The same subcarrier spacing can be used for synchronization and PBCH transmission. However, the subcarrier spacing for PDCCH transmission can be different from the one used for synchronization and PBCH transmission. If there are multiple control subbands, the indication can be at least applicable to a pre-defined common control subband.

The subcarrier spacing used for PDCCH or a common control subband can be indicated in the payload of PBCH, i.e., MIB. The following indication methods can be used:

Option 1:

Explicit indication of the PDCCH subcarrier spacing, e.g., $\lceil \log_2 N \rceil$ bits can be used to indicate which subcarrier spacing is used, among $\{\Delta f_0, \Delta f_1, \Delta f_2, \Delta f_3, \ldots, \Delta_{N-1}\}$.

Option 2:

Indicating the PDCCH subcarrier spacing among a pre-defined subcarrier spacing subset. For example, the full set of subcarrier spacing can be divided into multiple subsets. An example of two subset can be $\{\Delta f_0, \Delta f_1, \Delta f_2, \Delta f_3, \ldots, \Delta_{N_1-1}\}$, $\{\Delta f_{N_1}, \Delta f_{N_1+1}, \Delta f_{N_1+2}, \Delta f_{N_1+3}, \ldots, \Delta f_{2N_1-1}\}$, which are respectively used for lower frequency bands (e.g., below-6 GHz frequency band) and higher frequency bands (e.g., above-6 GHz frequency band). If the subcarrier spacing used by synchronization and PBCH belong to a subset, the indication only applies to the candidate subcarrier spacing in the corresponding subset which includes in the subcarrier spacing used by synchronization and PBCH. For example, if the subcarrier spacing used by synchronization and PBCH is $\Delta f_0$, the indication bits can be used to indicate which subcarrier spacing is used, among the subset $\{\Delta f_0, \Delta f_1, \Delta f_2, \Delta f_3, \ldots, \Delta_{N_1-1}\}$ which includes $\Delta f_0$.

Option 3: Indicating the relationship between the PDCCH subcarrier spacing and Sync/PBCH subcarrier spacing. It may be assumed that the subcarrier spacing used by synchronization and Sync/PBCH is $\Delta f_n$ ($0 \leq n < N$), several bits can be used to indicate the subcarrier spacing used for control channel (PDCCH) among a subset of the subcarrier spacing values closes to $\Delta f_n$. Based on a pre-define rule, the subset can be constructed in different way. The subset can be comprised of several subcarrier spacing values equal to and large than $\Delta f_n$ supported in the system, e.g., $\{\Delta f_n, \Delta f_{n+1}, \Delta f_{n+2}, \Delta f_{n+3}, \ldots\}$. For example, the subcarrier spacing used for PDCCH is $\Delta f_{n+m}$ if the indicated value is m (e.g., m=0, 1, 2, 3, ...). As another example, if $$\frac{\Delta f_{n+1}}{\Delta f_n} = 2,$$

the subcarrier spacing used for PDCCH is $2^m \times f_n$ if the indicated value is m (e.g., m=0, 1, 2, 3, ...). Alternatively, the subset can be comprised of several subcarrier spacing values around $\Delta f_n$ supported in the system, e.g., $\{\Delta f_{n-1}, \Delta f, \Delta f_{n+1}, \Delta f_{n+2}, \ldots\}$.

Option 4:

Conditional indication of whether the subcarrier spacing used for PDCCH is the same as that used by synchronization and PBCH. In this option, there can be a separate field (e.g., 1 bit) to indicate whether the subcarrier spacing used for PDCCH is the same as that used by synchronization and PBCH or not. If not the same, it may means that a pre-defined different subcarrier spacing is used for PDCCH. Alternatively, if the same, there is no additional indication of the subcarrier spacing values. If not same, there is additional indication about the subcarrier spacing used for PDCCH. The indication method can be similar as option 1, 2 or 3.

Option 5:

Joint encoding of the numerology indication filed with other field. In this option, the numerology indication and other files can be jointly encoded, e.g., the location of the PDCCH, and so on.

Figure 14:
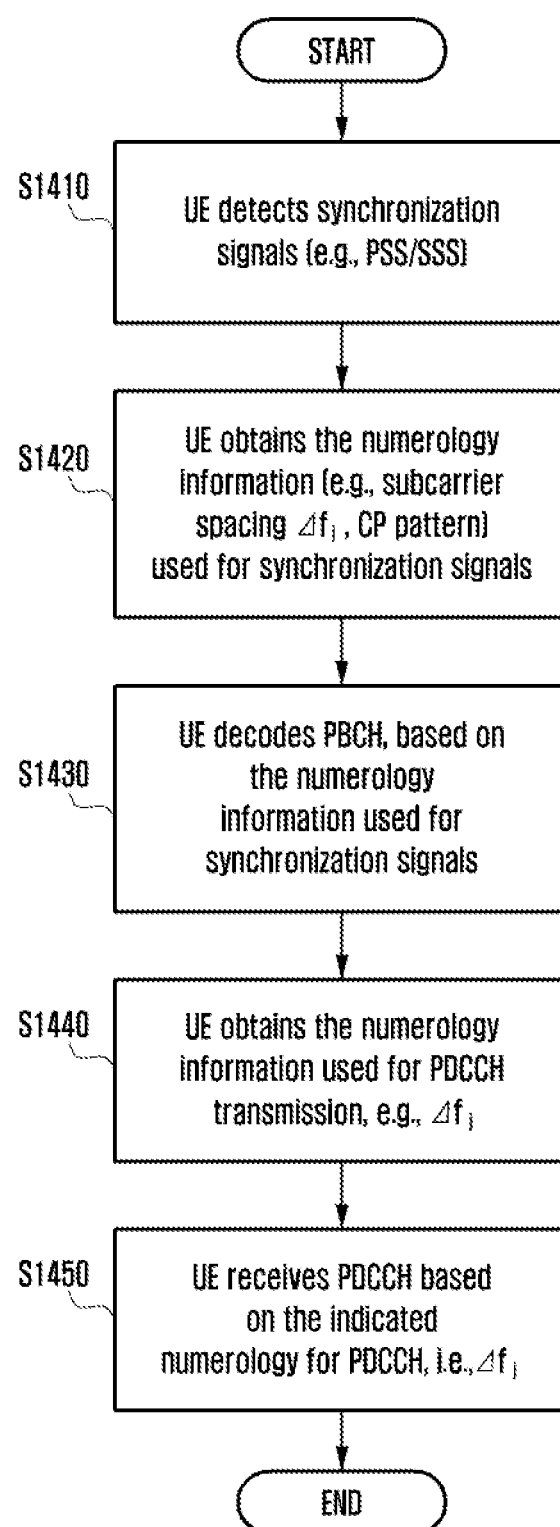
FIG. 14 illustrates a flowchart for obtaining numerology information by a UE according to an embodiment of the present disclosure.

FIG. 14 illustrates a flowchart for obtaining numerology information by a UE according to an embodiment of the present disclosure.

Referring to FIG. 14, a process of a UE for obtaining numerology information for synchronization, PBCH and PDCCH is illustrated. In operation S1410, the UE detects synchronization signals (e.g., PSS/SSS). In operation S1420, the UE obtains the numerology information (e.g., subcarrier spacing $\Delta f_i$, CP pattern) used for synchronization signals. In operation S1430, the UE decodes PBCH, based on the numerology information used for synchronization signals. In operation S1440, the UE obtains the numerology information used for PDCCH transmission (e.g., $\Delta f_j$). In operation S1450, the UE receives PDCCH based on the indicated numerology for PDCCH, i.e., $\Delta f_j$.

Figure 15:
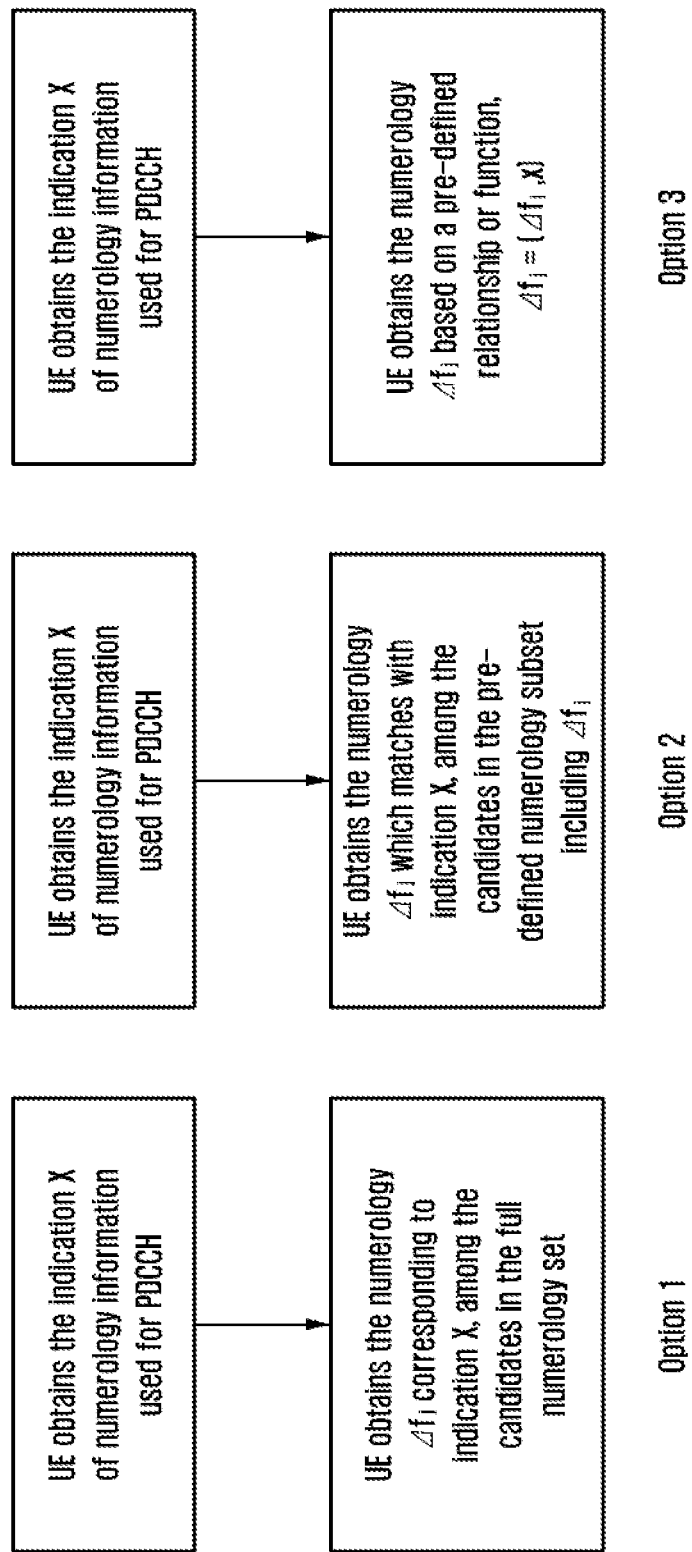
FIG. 15 illustrates a flowchart for obtaining numerology information used for PDCCH by a UE according to embodiments of the present disclosure.

FIG. 15 illustrates a flowchart for obtaining numerology information used for PDCCH by a UE according to embodiments of the present disclosure.

Referring to FIG. 15 illustrations of operation S1440 shown in FIG. 14, respectively for Option 1, 2 and 3 are provided.

In option 1, the UE obtains the indication X of numerology information used for PDCCH. The UE obtains the numerology $\Delta f_j$ corresponding to indication X, among the candidates in the full numerology set. In option 2, the UE obtains the indication X of numerology information used for PDCCH. The UE obtains the numerology $\Delta f_j$ which matches with indication X, among the candidates in the pre-defined numerology subset including $\Delta f_i$. In option 3, the UE obtains the indication X of numerology information used for PDCCH. The UE obtains the numerology $\Delta f_j$ based on a pre-defined relationship or function $\Delta f_j = f(\Delta f_i, X)$.

5) Physical Downlink Control Channel (PDCCH) Location and Size Indication

In LTE, the synchronization signals and PBCH are mapped to the central resources (i.e., 6 PRBs) around the carrier center frequency in a symmetric manner, i.e., the center of synchronization signals and PBCH is always aligned with the carrier center frequency. In the future cellular networks, there may be the case that the synchronization signals and PBCH are mapped in a certain portion of the resources rather than the central resources around the carrier center frequency. For the PDCCH, it is possible that the PDCCH can be mapped to the central resources around the carrier center frequency, or in a certain portion of the resources rather than the central resources around the carrier center frequency.

It may be assumed that the synchronization signals and PBCH are transmitted in the same frequency location, the offset between the center frequency of synchronization signals and the carrier center frequency can be indicated in the MIB. Together with the system bandwidth information, the frequency resources occupied by the carrier can be obtained. The frequency offset or difference between the center frequency of synchronization signals and the carrier center frequency can be indicated in the MIB or SIB.

Figure 16:
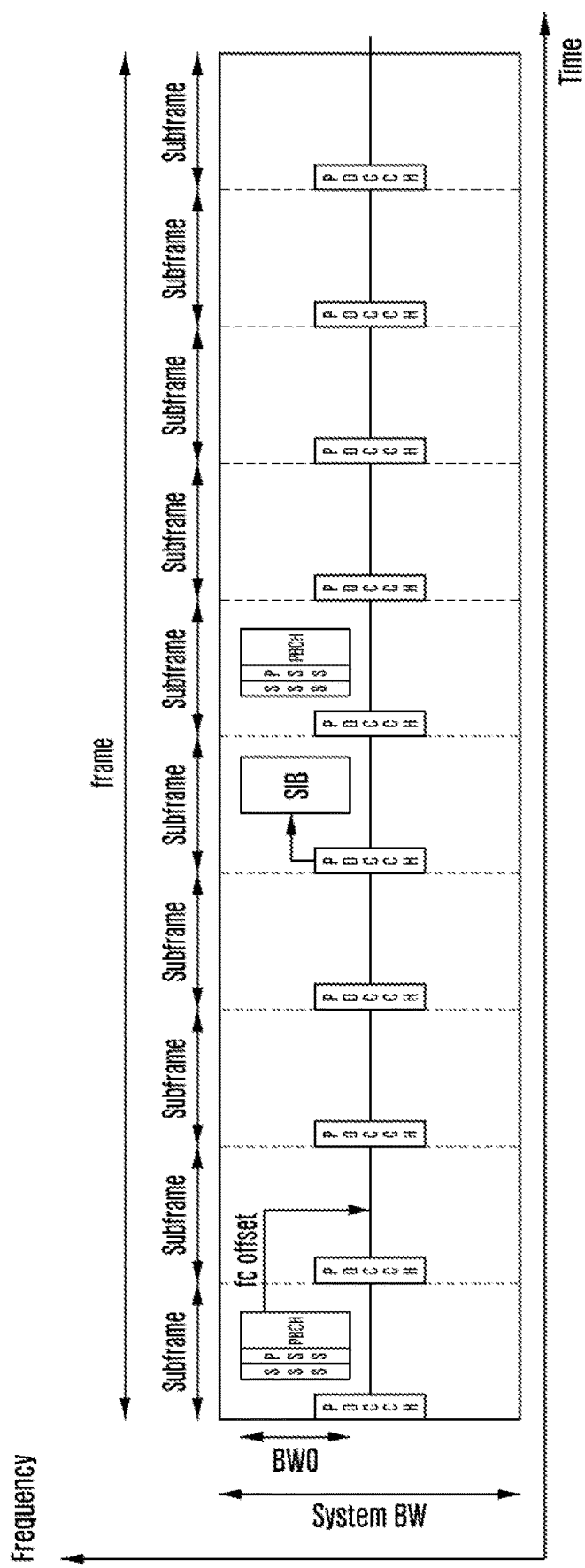
FIG. 16 illustrates an example for indicating location and size of the PDCCH according to an embodiment of the present disclosure.

FIG. 16 illustrates an example for indicating location and size of the PDCCH according to an embodiment of the present disclosure.

Referring to FIG. 16, an example is illustrated to show that the carrier center frequency can be derived based on the indication in MIB. The following indication methods can be considered:

Option 1:

The frequency offset between the center frequency of synchronization signals and the carrier center frequency can be indicated by integer times of a pre-defined value $f_{offset-unit}$.

The pre-defined value ($f_{offset-unit}$) can be the minimum offset between two candidate locations in the frequency domain. For example, the pre-defined value can be the same as the size of synchronization raster of UE ($f_{sync-raster}$). The size of synchronization raster of UE ($f_{sync-raster}$) can be different in different frequency bands. Alternatively, the $f_{offset-unit}$ can be the same as the RB size in the carrier ($f_{RB}$), or the lowest common multiple of the size of synchronization raster and RB size $f_{lcn-raster-RB}$. The RB size may depend on the subcarrier spacing used in the carrier, e.g., 180 kHz assuming subcarrier spacing of 15 kHz and 12 subcarriers per RB, or 360 kHz assuming subcarrier spacing of 30 kHz and 12 subcarriers per RB. If the size of synchronization raster is 100 kHz, the lowest common multiple of the size of synchronization raster and size of RB is 900 kHz and 1800 kHz, respectively for the case with subcarrier spacing of 15 kHz and 30 kHz. Similarly, the size of synchronization raster may depend on the frequency bands, e.g., small size for low frequency bands, and large size for high frequency band. Based on a pre-defined rule, the offset size $f_{offset-unit}$ can be different in different frequency bands, and in different subcarrier spacing cases.

In MIB, the frequency offset between the center frequency of synchronization signals and the carrier center frequency can be indicated in terms of number of pre-defined value $f_{offset-unit}$. For example, $\lceil \log_2 2N \rceil$ bits can be used to indicate the value among $n \in [-N, -N+1, \ldots, -2, -1, 0, 1, 2, \ldots, N-1]$.

The UE may assume there is an offset with amount of $n \times f_{offset-unit}$. The number of required bits may depend on the number of possible candidates for synchronization transmission in the system, affected by the system bandwidth, numerology used for synchronization transmission, and so on. The size of this field can be the same for all cases, or can be different based on a pre-defined rule.

Option 2:

In MIB, it can be indicated whether the current center frequency detected by the synchronization signals and PBCH is the carrier center frequency or not, e.g., by using 1 bit filed to indicate this. If the same, there is no need of further indication of the frequency offset. Otherwise, i.e., the currently detected center frequency is not the carrier center frequency, the following filed may indicate the frequency offset, as described in Option 1.

Option 3:

Joint encoding of the frequency offset filed with other field. In this option, the frequency offset and other files can be jointly encoded, e.g., the BW, the PDCCH numerology, the location of the PDCCH, and so on.

The PDCCH transmission can be flexible in terms of transmission BW, location in the system BW, and so on. Different from LTE, the PDCCH transmission BW can be different from the full BW supported in the system or carrier. If the PDCCH transmission BW is less than the full system BW, UE needs to know the location of the PDCCH transmission. Or at least, if there are multiple PDCCH regions, the location indication can be applicable to a pre-defined common control sub-band. Here the location may mean a reference frequency location for PDCCH resource mapping, or a reference frequency location to search PDCCH resource mapping unit. For example, the center of a control sub-band can be a reference frequency location for PDCCH location indication.

Figure 17:
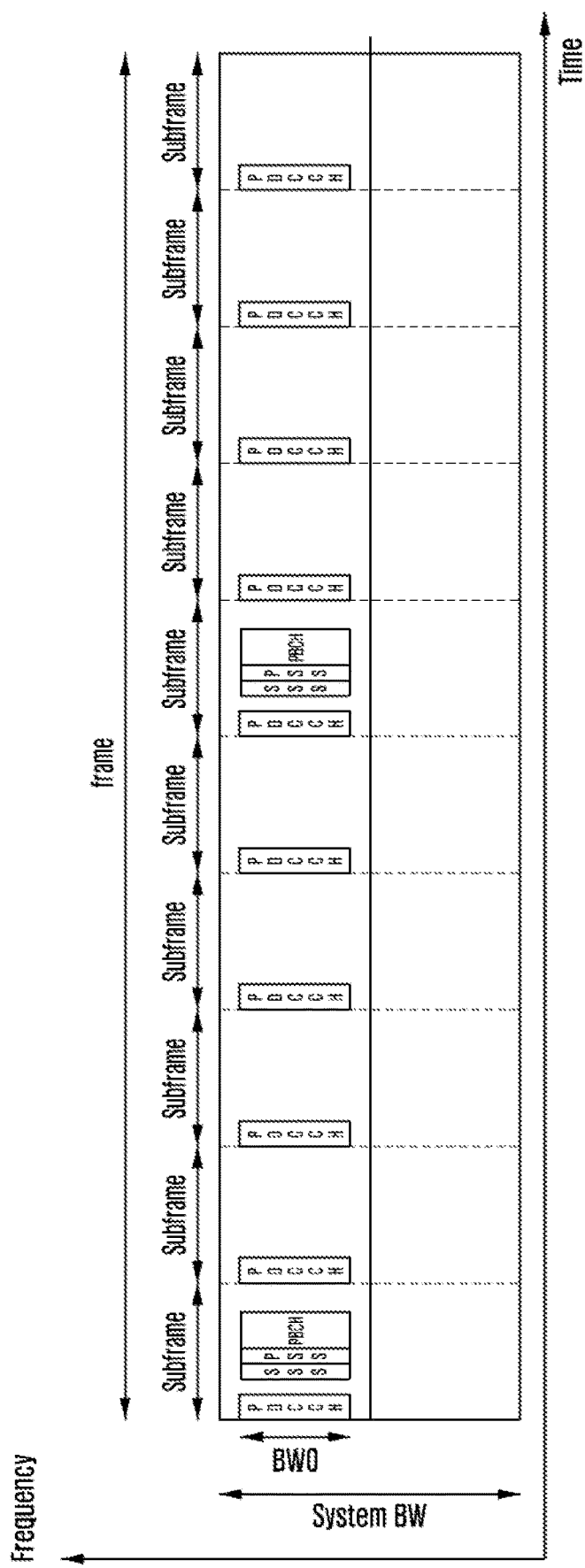
FIG. 17 illustrates an example for indicating location and size of the PDCCH according to another embodiment of the present disclosure.

FIG. 17 illustrates an example for indicating location and size of the PDCCH according to another embodiment of the present disclosure.

Referring to FIG. 17, it is assumed that the PDCCH may mean a reference control sub-band, e.g., a common control sub-band, but not limited thereto. There is case that the PDCCH may not always be mapped around the carrier center frequency. Since the center frequency of synchronization signals and the carrier center frequency may be different, it is possible that the PDCCH may be mapped around the center frequency detected by PSS/SSS/PBCH, as shown in FIG. 17. It can be indicated whether the PDCCH is mapped based on the carrier center frequency or the current center frequency detected by PSS/SSS/PBCH, e.g., by 1 bit. Alternatively, it can be indicated whether the PDCCH is mapped based on the current center frequency detected by PSS/SSS/PBCH or not, e.g., by 1 bit. This indication can be jointly encoded with another field, e.g., indication of difference between the center frequency of synchronization signals and the carrier center frequency. In this case, a combined indication field can be used to indicate the difference between the center frequency of synchronization signals and the carrier center frequency, and the PDCCH location. For example, 2 bits can be used to indicate the following cases:

Case 1: The center frequency of synchronization signals is the same as the carrier center frequency, and the PDCCH location is in the carrier center frequency, as shown in the example of FIG. 1B Case 2: The center frequency of synchronization signals is different from the carrier center frequency, and the PDCCH location is in the center frequency of synchronization signals, as shown in the example of FIG. 5B Case 3: The center frequency of synchronization signals is different from the carrier center frequency, and the PDCCH location is in the carrier center frequency, as shown in the example of FIG. 5A Case 4: Reserved.

Depending on the indication cases, there is possible pending further indication of the difference between the center frequency of synchronization signals and the carrier center frequency, e.g., in Case 2 and 3. Otherwise, there can be no further indications since the center frequency of synchronization signals is the same as the carrier center frequency.

Referring to FIG. 16 or FIG. 17, assuming that the PDCCH is mapped around a certain reference frequency location, the PDCCH transmission BW is needed for PDCCH decoding. It is also possible that the indicated PDCCH size is only for the common control subband. It can be pre-defined, derived implicitly, or signaled to the UEs in MIB or SIB. The following methods can be considered:

Option 1:

Pre-defined size without indication. Different sizes can be considered for different system BW cases or in different frequency bands. For example, the size can be X when the system BW is less than BW_i, and Y when the system BW is larger than BW_i but less than BW_j, and Z when the system BW is larger than BW_j. The values of X, Y, Z and BW_i, BW_j can be pre-defined.

Option 2:

The PDCCH transmission BW can be explicitly indicated. The BW options for PDCCH transmission can be pre-defined. For example, the BW options for PDCCH transmission can be selected from the supported system BW cases and/or the supported UE BW case. The BW option for PDCCH transmission is explicitly indicated.

Option 3:

To reduce the overhead, the BW options for PDCCH transmission case can be pre-defined for all the system BW cases. For example, the BW options for PDCCH transmission can be selected from the supported system BW cases and/or the supported UE BW case. Given a system BW, the BW option for PDCCH transmission is indicated. The required number of indication can be different for different BW cases and numerology cases.

Option 4:

There can be one bit indication to inform that if the current PDCCH transmission BW is the same as the system BW. If the same, there is no further signaling. If not, it is further indicated about the actual used PDCCH transmission BW. The indication method can be the same as Option 1 or 2 or 3.

Option 5:

The PDCCH transmission BW can be related to the BW of the synchronization signals and PBCH. Assuming that BW of the synchronization signals and PBCH is X, the indication can be a functionality of the BW X, e.g., X, 2X, and so on. The functionality can be different for different cases, e.g., in terms of system BW, and/or frequency band, and so on.

If there is no restriction to always map the PDCCH location around the carrier center frequency or the center frequency detected based on PSS/SSS/PBCH, the PDCCH transmission can be located in the system BW in a more flexible manner. The PDCCH location information needs to be additionally signaled. The following PDCCH location information can be signaled.

Option 1:

The reference PRB index used by PDCCH transmission is indicated. The required number of indication can be different for different BW cases and numerology cases.

Option 2:

To reduce the overhead, a predefined number of candidate reference PRBs for PDCCH transmission can be defined. It is indicated which reference PRB case is used in the current PDCCH transmission.

Option 3:

The offset cases between the center of PDCCH transmission and a pre-defined reference frequency can be signaled. The pre-defined reference frequency can be the carrier center frequency, or the center frequency of the PSS/SSS/PBCH transmission.

Besides the PDCCH location in the frequency domain, it may be also necessary to indicate the PDCCH location in the time domain in some scenarios. In LTE, the NR PDCCH is always located in the first one or more OFDM symbols in a subframe. The UEs can by default search PCFICH/PHICH/PDCCH from the $1^{st}$ OFDM symbol. However, in the NR system, various situations and flexible design need to be considered.

Figure 18:
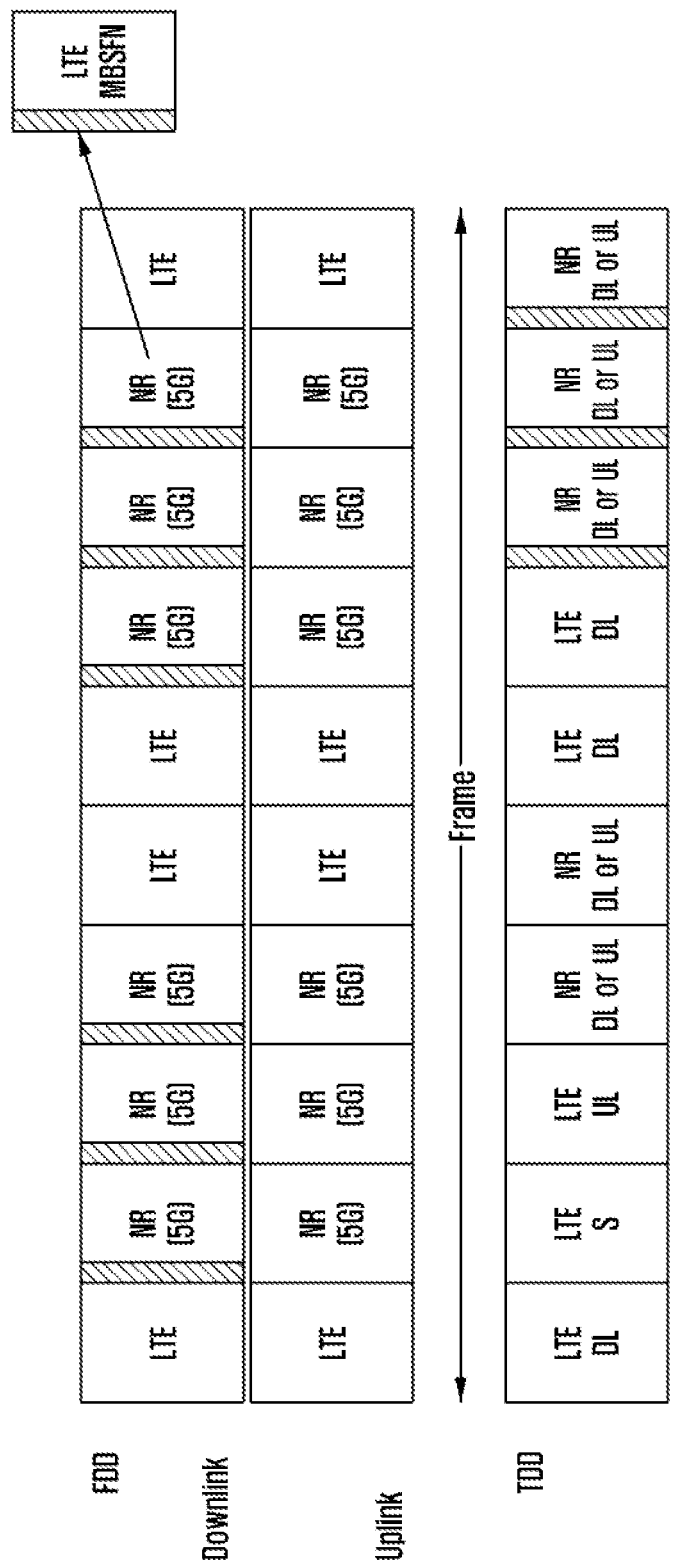
FIG. 18 illustrates an example for long term evolution-new radio (LTE-NR) coexistence in the same spectrum respectively for frequency division duplex (FDD) and time division duplex (TDD) modes according to an embodiment of the present disclosure.

FIG. 18 illustrates an example for LTE-NR coexistence in the same spectrum respectively for FDD and TDD modes according to an embodiment of the present disclosure.

Referring to FIG. 18, it is possible that NR may coexist with LTE spectrum, i.e., existed with LTE. For example, in the LTE FDD mode, NR can utilize the LTE MBSFN subframes in the downlink case, and utilize the normal subframe in the uplink case. In the LTE TDD mode, NR can utilize the LTE MBSFN subframes and uplink subframes. An example of LTE-NR coexistence in the same spectrum is shown in FIG. 18, respectively for FDD and TDD modes.

Figure 19:
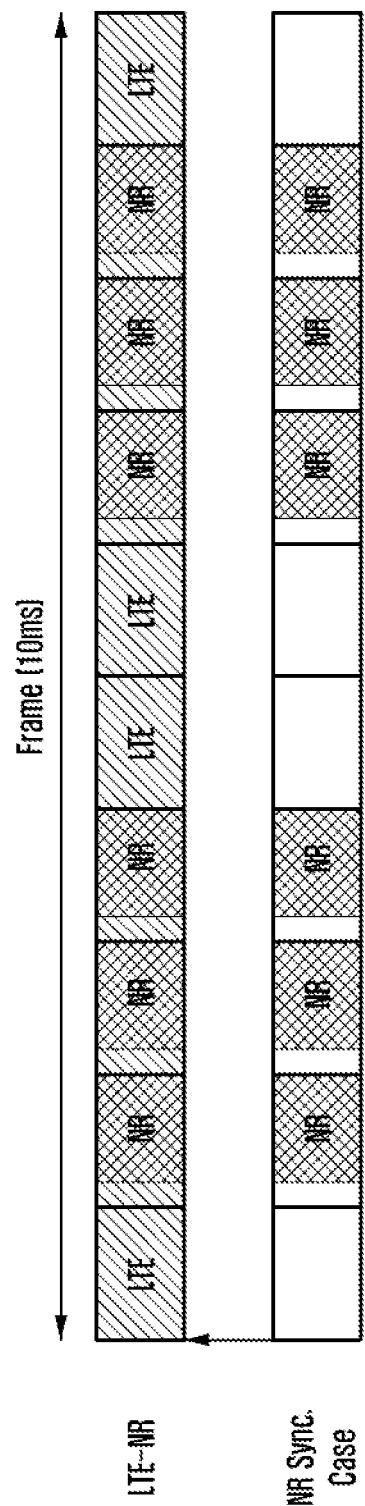
FIG. 19 illustrates an example for a subframe boundary aligned between NR and LTE according to an embodiment of the present disclosure.

FIG. 19 illustrates an example for a subframe boundary aligned between NR and LTE according to an embodiment of the present disclosure.

In FDD case, the NR system can operate in the LTE MBSFN subframes. It is assumed that the LTE and NR are synchronized in the subframe level, i.e., the subframe boundary is aligned between NR and LTE, as shown in FIG. 19. However, in the LTE MBSFN subframe, the first or two OFDM symbols need to be reserved for normal LTE usage, e.g., CRS transmission, LTE PCFICH/PHICH/PDCCH transmission, etc.

Figure 20:
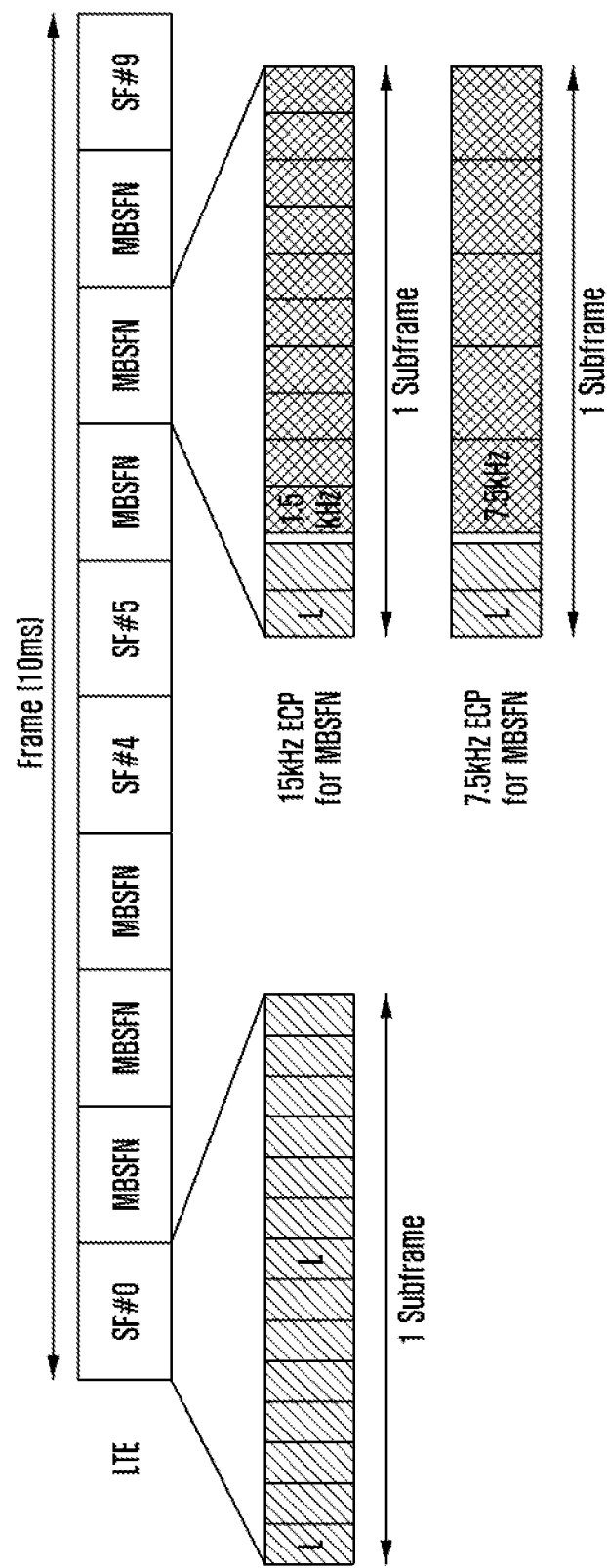
FIG. 20 illustrates an example for first two orthogonal frequency-division multiplexing (OFDM) symbols reserved in a multicast-broadcast single-frequency network (MBSFN) subframe according to an embodiment of the present disclosure.

FIG. 20 illustrates an example for first two OFDM symbols reserved in a MBSFN subframe according to an embodiment of the present disclosure.

Referring to FIG. 20, the first two OFDM symbols are reserved in a MBSFN subframe. Therefore, when the LTE MBSHN subframes are used by NR, the first one or multiple OFDM symbols need to be reserved for LTE usage while not available for NR.

Figure 21:
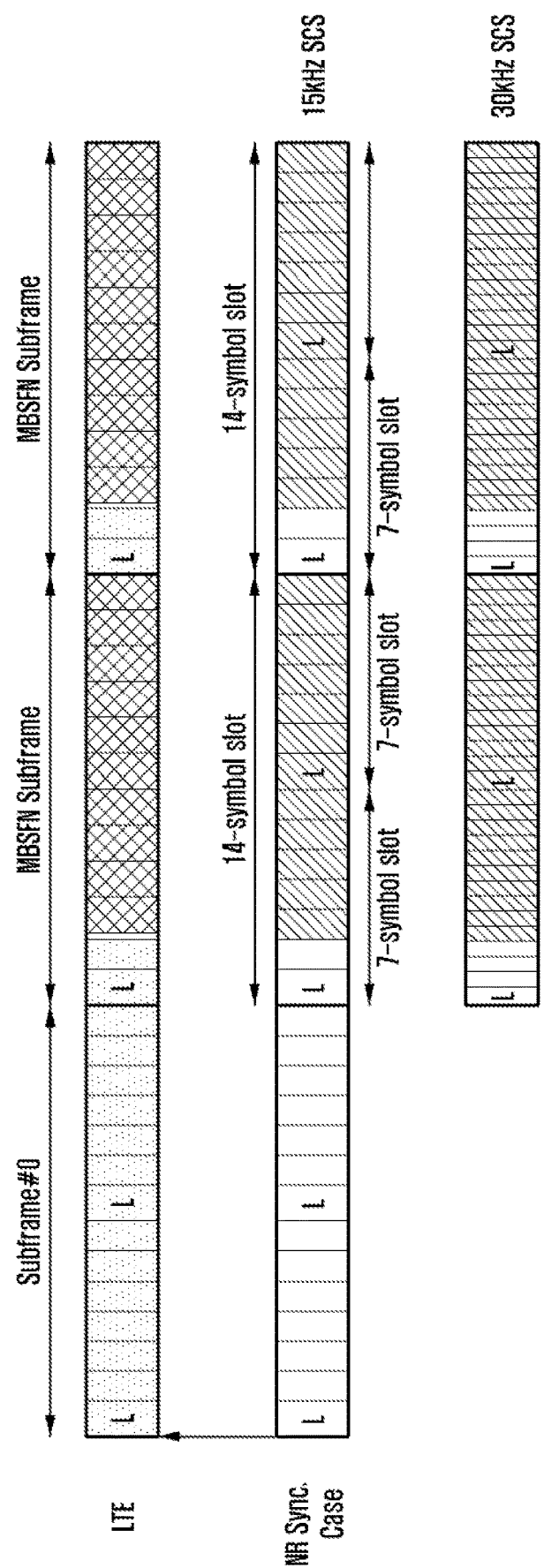
FIG. 21 illustrates an example for subcarrier spacing used in new radio (NR) according to an embodiment of the present disclosure.

FIG. 21 illustrates an example for subcarrier spacing used in NR according to an embodiment of the present disclosure.

Referring to FIG. 21, when 15 kHz subcarrier spacing is used in NR, i.e., the same as LTE numerology, up to two OFDM symbols may not be used in a NR subframe. When 30 kHz subcarrier spacing is used in NR, up to four OFDM symbols may not be used in a NR subframe.

When NR UEs try to access the system, it detects the synchronization signals and read PBCH. Then the UEs try to get the full system information for system access. The system information may be scheduled by PDCCH. Similar as LTE, the NR PDCCH can be located in the first one or more OFDM symbols in a subframe. However, in the NR-LTE coexistence scenario, the situation that the first one or more OFDM symbols are not available in a subframe needs to be handled.

It is possible to indicate UEs about the starting point to monitor the PDCCH; at least the indication can be applied to the subframes where UEs try to read some essential system information, e.g., SIB 1. The indication can be carried in MIB (PBCH). The following options can be considered to indicate the offset to monitor PDCCH in a certain subframe (e.g., for system information reception):

Option 1: There can be 1 bit indication to inform UEs, if the PDCCH starts from the $1^{st}$ OFDM symbol in a subframe or slot. If not, the UE may need to monitor PDCCH in a blind manner. For example, the UE may try from the $2^{nd}$ OFDM symbol, and then the $3^{rd}$ OFDM symbol for PDCCH searching.

Option 2: There can be 1 bit indication to inform UEs, if the PDCCH starts from the $1^{st}$ OFDM symbol or a pre-defined OFDM symbol index in a subframe or slot. The pre-defined OFDM symbol index may be determined by the worst case in LTE-NR coexistence case, e.g., 2 OFDM symbols in LTE. Then for NR operation, the pre-defined OFDM symbol index can be 3 for 15 kHz subcarrier spacing case, 5 for 30 kHz subcarrier spacing case, and so on. The pre-defined OFDM symbol index can be different for different numerology cases.

Option 3: There can be an indication field to explicitly indicate the starting OFDM symbol index in a subframe or slot. For example, with 2 bit indication, 4 predefined candidate starting OFDM symbol index can be indicated, e.g., 1, 2, 3, 4. Similarly, the candidate starting OFDM symbol index can be different for different numerologies. For example, in case of 15 kHz subcarrier spacing case, {1, 2, 3, reserved} can be indicated, and in case of 30 kHz subcarrier spacing case, {1, 2, 3, 5} are indicated.

Figure 22:
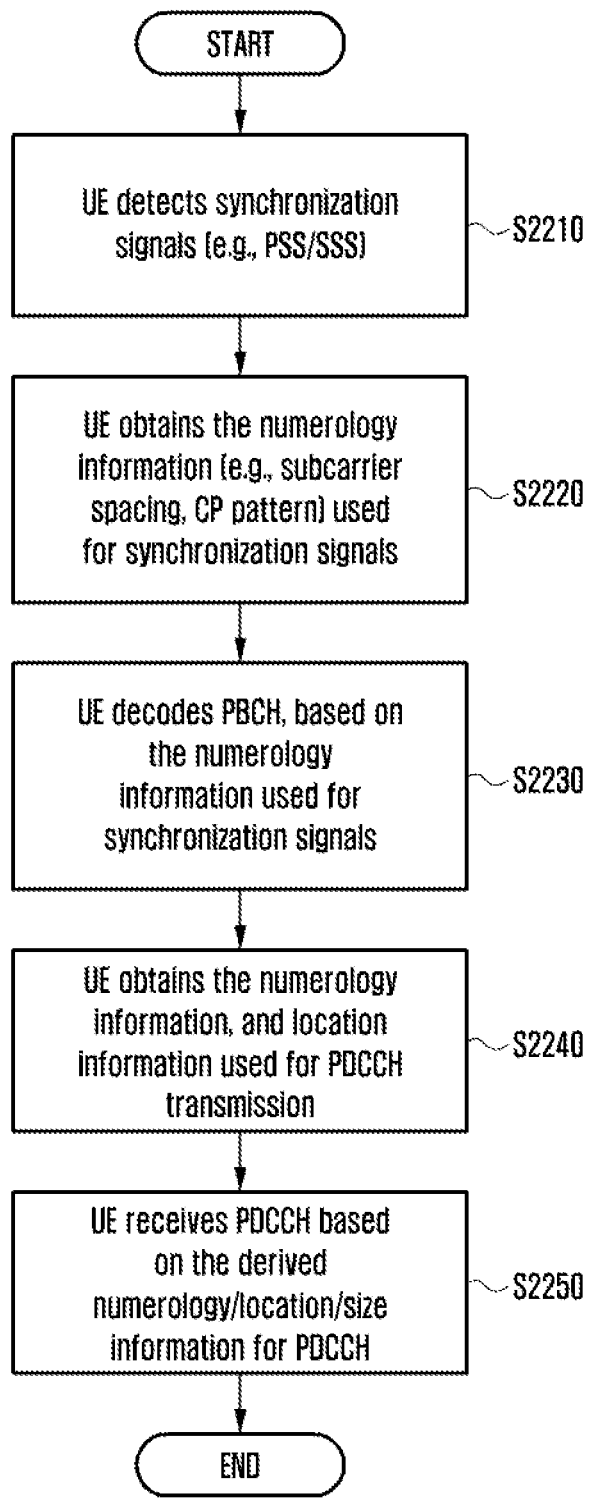
FIG. 22 illustrates a flowchart for obtaining PDCCH location and size information by a UE according to an embodiment of the present disclosure.

FIG. 22 illustrates a flowchart for obtaining PDCCH location and size information by a UE according to an embodiment of the present disclosure.

Referring to FIG. 22, a process of a UE obtaining PDCCH location and size information is illustrated. The UE detects synchronization signals (e.g., PSS/SSS) in operation S2210. The UE obtains the numerology information (e.g., subcarrier spacing, CP pattern) used for synchronization signals in operation S2220. The UE decodes PBCH, based on the numerology information used for synchronization signals in operation S2230. The UE obtains the numerology information, and location information used for PDCCH transmission in operation S2240. The UE receives PDCCH based on the derived numerology/location/size information for PDCCH in operation S2250.

6) Common Control Channel

It is necessary to transmit some control information which is common in the cell. The control information may be related to the essential information of the resource utilization, e.g., the size of PDCCH in the time and frequency domain, the resource availability in the current TTI. In addition, similar as in LTE, the scheduling information of system information, paging, and random access response (RAR) may be transmitted in the common control channel.

In LTE, a Physical Control Format Indicator Channel (PCFICH) is used to indicate the number of OFDM symbols used by the control channel in each subframe. In the next generation cellular networks, it is also possible to have a dedicated channel like PCFICH to indicate the number of OFDM symbols used by the control channel. Or, the number of OFDM symbols can be pre-defined, which may be different in different system BW case. For example, for small system BW case, 2 or 3 OFDM symbols are used for control channel transmission in a TTI. For larger system BW case, 1 or 2 symbols can be used. According to the resource availability in different system BW, the pre-defined number of OFDM symbols can be used for control channel transmission in each system BW case, which avoids the need of indication in each TTI. Alternatively, it is possible to have indication in some cases, and pre-defined number of OFDM symbols in some other cases. If indicated, the indication can be applicable to the common control sub-band only, or applicable to all the control sub-bands.

It is also possible to indicate the used control channel resources in the frequency domain. For example, if there are multiple control sub-bands in the frequency, it is possible to indicate the number of used control sub-bands, or a bitmap of the used control sub-bands in the current TTI.

Figure 23:
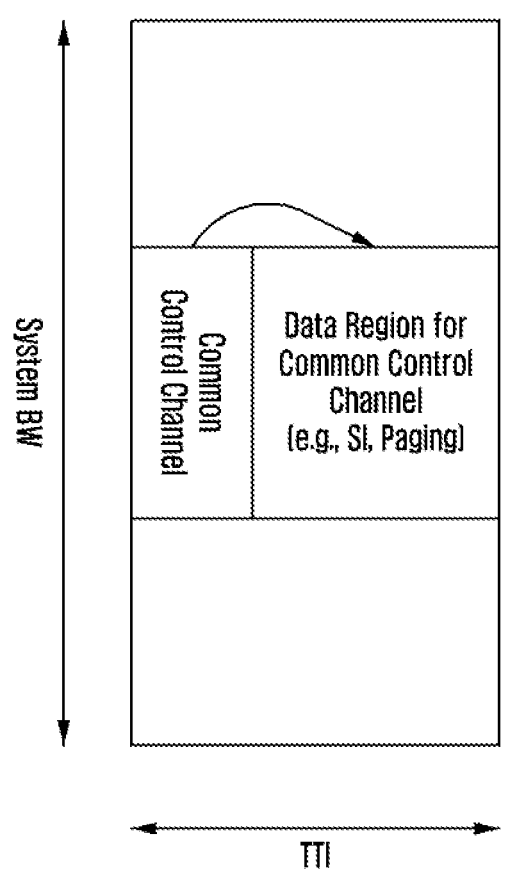
FIG. 23 illustrates an example for a common control channel according to an embodiment of the present disclosure.

FIG. 23 illustrates an example for a common control channel according to an embodiment of the present disclosure.

Referring to FIG. 23, the common control channel can be the default control region for UE to access before connected to the network. It is also possible to be the default control region for UE in idle mode to monitor downlink control information (DCIs). In that case, the frequency domain resource allocations indicated in the DCI may only apply to the same bandwidth as the common control channel for data transmission, as shown in FIG. 23. This enables a UE to keep the same RF bandwidth for both control and data channels. By restricting the UE RF bandwidth in the pre-configured smaller bandwidth, it is helpful to reduce the UE power consumptions compared to receiving the whole system bandwidth.

7) Control Subband

After the UE accesses the common control channel, and obtains the necessary system information and configurations for initial access, the UE can perform random access to the network. During the random access procedure, the gNB can configure a certain control subband to UE for DCI monitoring in the connected mode. The complete information of control subband configurations can be included in the system information, including the number of control subbands, location the in frequency domain, and size (e.g., in terms of RBs), and used numerology (e.g., subcarrier spacing). The control subband can occupy a contiguous number of RBs in the frequency domain, or non-contiguous number of RBs in the frequency domain.

Figure 24:
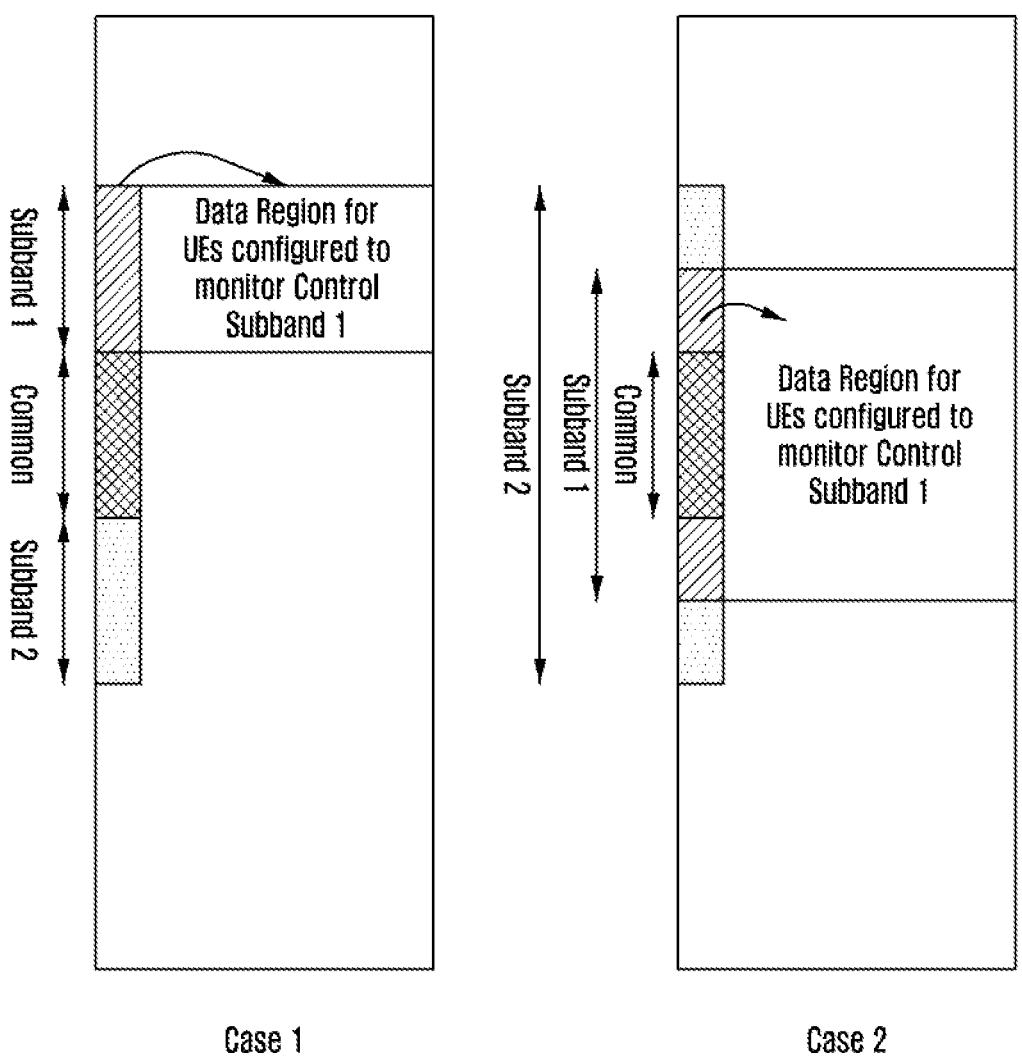
FIG. 24 illustrates an example for a control subband according to an embodiment of the present disclosure.

FIG. 24 illustrates an example for a control subband according to an embodiment of the present disclosure.

Referring to FIG. 24, one subband can occupy a portion in the system bandwidth. The control subband may occupy a bandwidth portion different from the common control channel, as shown in Case 1. Alternatively, the common control channel may be included in the control subband, as shown in Case 2.

Figure 25:
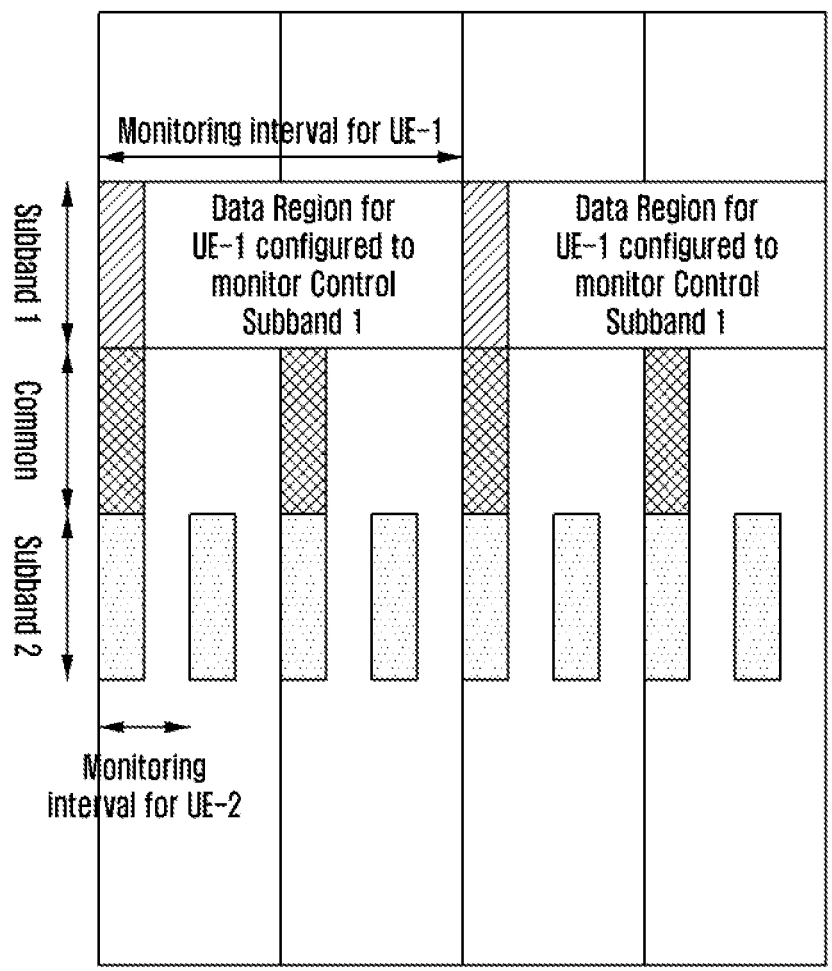
FIG. 25 illustrates an example for keeping the same radio frequency (RF) bandwidth for both control and data channels according to an embodiment of the present disclosure.

FIG. 25 illustrates an example for keeping the same RF bandwidth for both control and data channels according to an embodiment of the present disclosure.

According to different configurations of the control subbands, the UE's behavior may be different. Basically, the UE in default monitors the configured control subband based on the configured monitoring interval.

Referring to FIG. 25, UE-1 and UE-2 are configured to monitor different control subband with different monitoring intervals. Similarly, the frequency domain resource allocations indicated in the DCI may only apply to the same bandwidth as the control subband for data transmission, as shown in FIG. 25. This enables UE to keep the same RF bandwidth for both control and data channels. By restricting the UE RF bandwidth in the configured subband, it is helpful to reduce the UE power consumption compared to receiving the whole system bandwidth.

In Case 1 of FIG. 24, if the UE does not receive common control channel, some necessary control information may be transmitted in the control subband. For example, the number of OFDM symbols used for the control subband can be indicated, which means there can be subband-specific PCFICH. In addition, there is necessity to receive indication of system information modification, which can be indicated in the paging information transmitted in the common control channel. Therefore, the system information modification indication can be indicated in the control subband. After receiving indication of system information modification, the UE needs to receive both common control channel and configured control subband. The motivation of receiving the common control channel is to receive the updated system information. After finishing system information update, the UE can switch to receive the configured control subband only.

Figure 26:
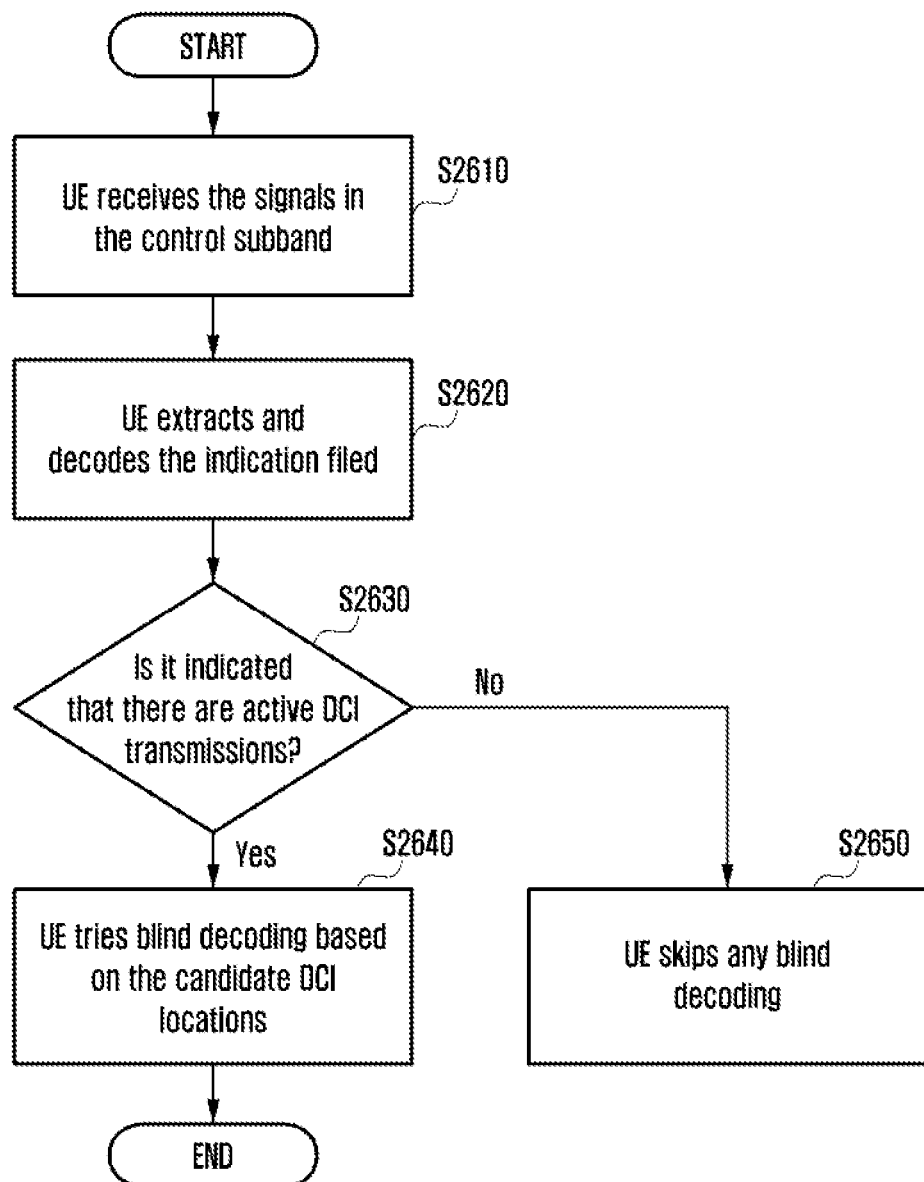
FIG. 26 illustrates a flowchart for indicating if there is any active downlink control information (DCI) transmission in the current control subband according to an embodiment of the present disclosure.

FIG. 26 illustrates a flowchart for indicating if there is any active DCI transmission in the current control subband according to an embodiment of the present disclosure.

In order to avoid PDCCH blind decoding attempts and reduce UE power consumptions, it is possible to have a pre-indication in a control subband to indicate if there is any active DCI transmission in the current control subband. The pre-indication can be a 1-bit YES/NO indication to inform UE if there is a need to continue trying PDCCH blind decoding attempts in the control subband. The location to transmit this indication within a certain control subband can be pre-defined.

Referring to FIG. 26, the UE behavior with the above operation case is illustrated. The UE receives the signals in the control subband in operation S2610. The UE extracts and decodes the indication field in operation S2620. The UE identifies whether it is indicated that there are active DCI transmissions in operation S2630. If it is indicated that there are active DCI transmissions, the UE tries blind decoding based on the candidate DCI locations in operation S2640. If it is not indicated that there are active DCI transmissions, the UE skip any blind decoding in operation S2650.

Figure 27:
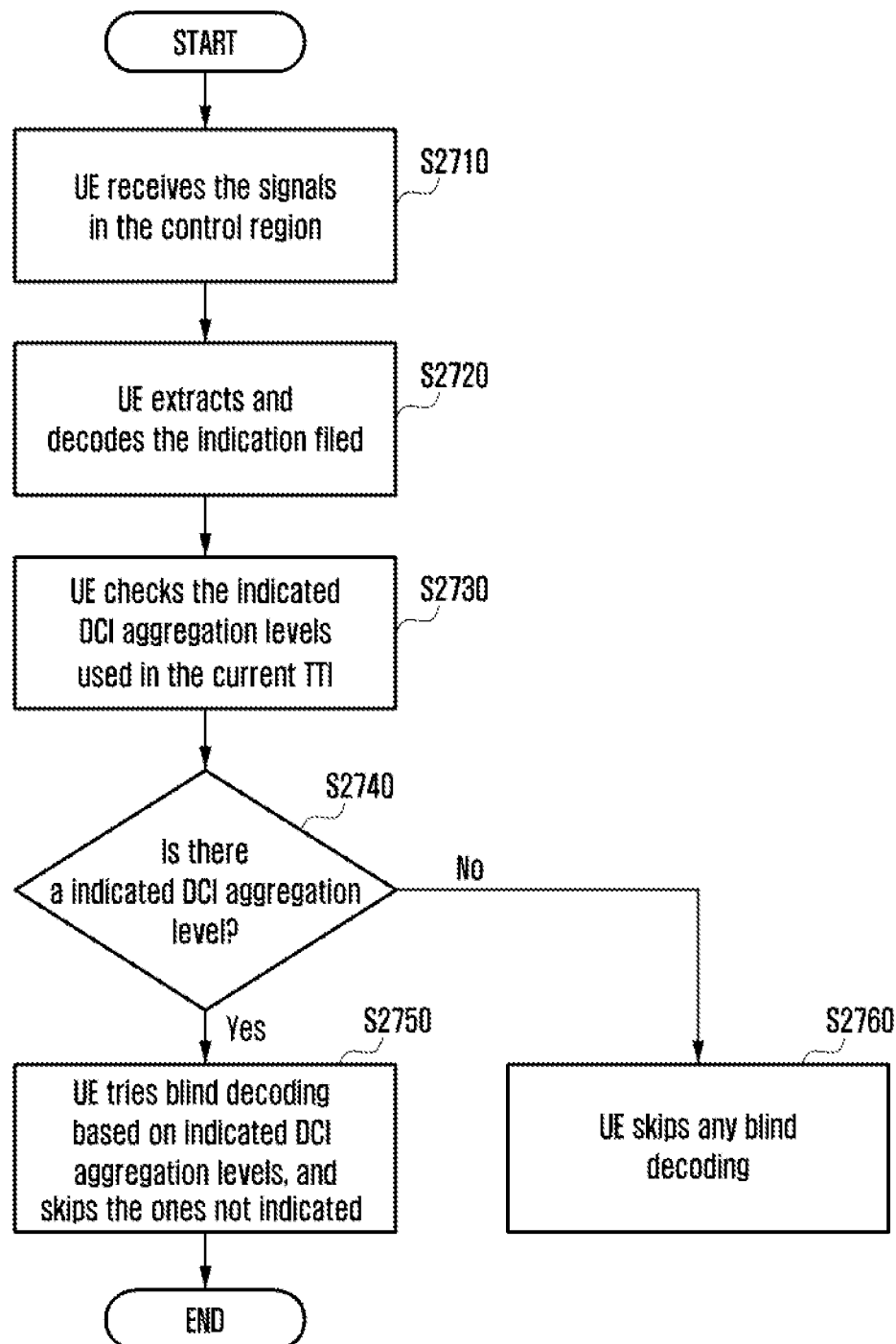
FIG. 27 illustrates a flowchart for indicating the aggregation levels of DCIs transmitted in the current TTI according to an embodiment of the present disclosure.

FIG. 27 illustrates a flowchart for indicating the aggregation levels of DCIs transmitted in the current TTI according to an embodiment of the present disclosure.

To reduce the number of PDCCH blind decoding attempts, it is possible to indicate the aggregation levels (e.g., 1, 2, 4, 8) of DCIs transmitted in the current TTI. A bitmap can be transmitted to indicate if a certain aggregation level is used or not for the DCIs transmitted in the current TTI. The location to transmit this indication can be pre-defined within the common control channel or a certain control subband. If transmitted in the common control channel, the indication may apply to the UE-specific DCIs in the whole system bandwidth of the current TTI. If transmitted in the control subband, the indication may only apply to the UE-specific DCIs in that control subband. For example, a 4-bit bitmap can indicate if the aggregation level 1, 2, 4, 8 is used or not. Based on this indication, the UEs can only try the blind decoding of DCIs with the indicated aggregation levels, while ignore the blind decoding of DCIs with non-indicated aggregation levels.

Referring to FIG. 27, the UE behavior with the above operation case is illustrated. The UE receives the signals in the control region in operation S2710. The UE extracts and decodes the indication field in operation S2720. The UE checks the indicated DCI aggregation levels used in the current TTI in operation S2730. If there is an indicated DCI aggregation level in operation S2740, the UE tries blind decoding based on indicated DCI aggregation levels, and skips the ones not indicated in operation S2750. If there is not an indicated DCI aggregation level, the UE skips any blind decoding in operation S2760.

Figure 28:
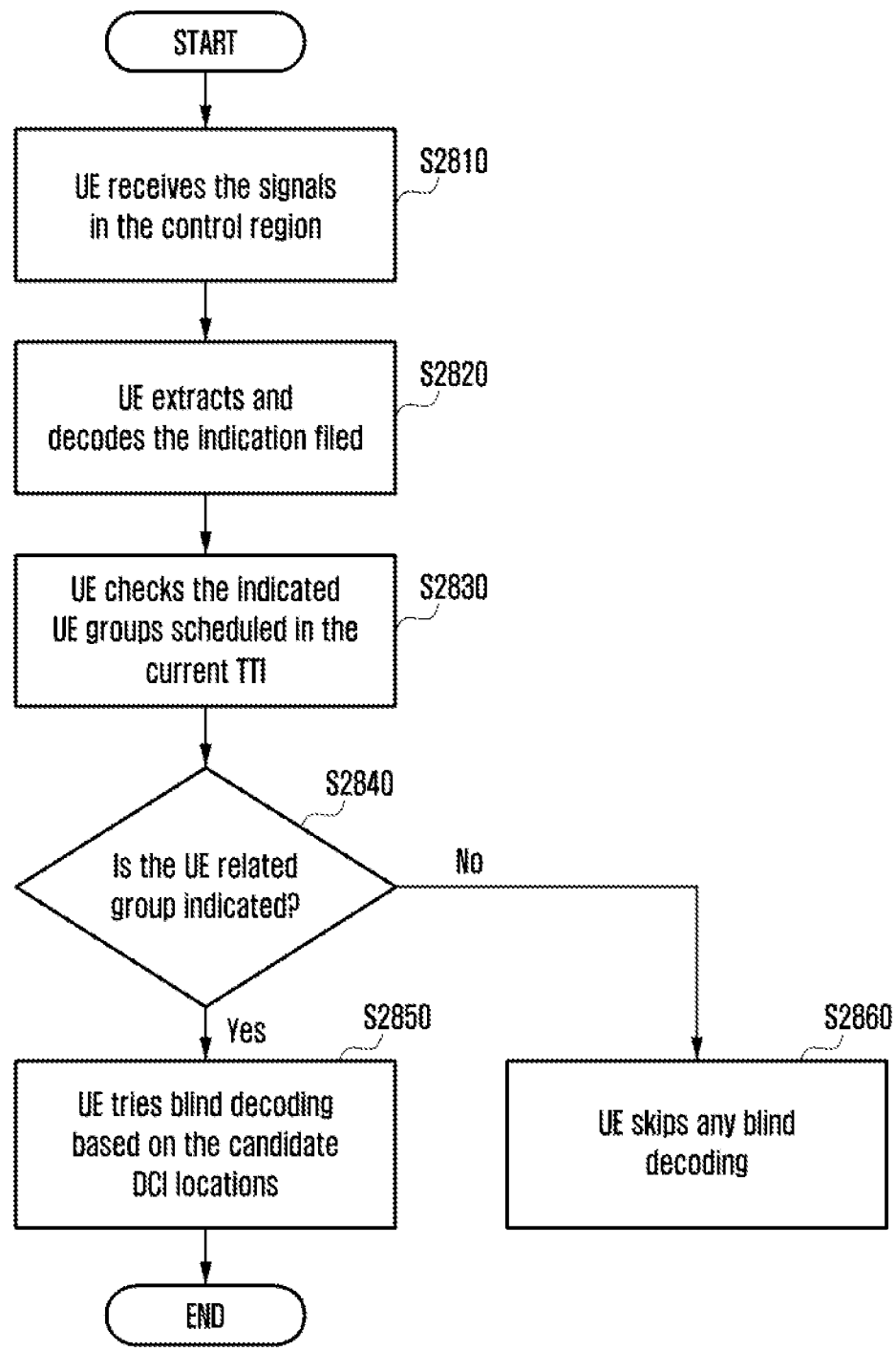
FIG. 28 illustrates a flowchart for indicating UE groups scheduled in the current TTI according to an embodiment of the present disclosure.

FIG. 28 illustrates a flowchart for indicating UE groups scheduled in the current TTI according to an embodiment of the present disclosure.

Alternatively, it is possible to indicate some partial information of scheduled UE in the current TTI. For example, there can be indication of partial information of the UE RNTIs scheduled in the current TTI. The UEs can be divided into several groups based on a pre-defined rule, e.g., X groups. An X-bit bitmap can indicate if a certain UE group has scheduled UEs in the current TTI. For example, if X=10, there can be 10 different UE groups which have different last digit in the UE RNTI. The location to transmit this indication can be pre-defined within the common control channel or a certain control subband. If transmitted in the common control channel, the indication may apply to the UE-specific DCIs in the whole system bandwidth of the current TTI. If transmitted in the control subband, the indication may only apply to the UE-specific DCIs in that control subband.

Referring to FIG. 28, the UE behavior with the above operation case is illustrated. The UE receives the signals in the control region in operation S2810. The UE extracts and decodes the indication field in operation S2820. The UE checks the indicated UE groups scheduled in the current TTI in operation S2830. If the UE related group is indicated in operation S2840, the UE tries blind decoding based on the candidate DCI locations in operation S2850. If the UE related group is not indicated, the UE skips any blind decoding in operation S2850.

8) Control Unit Mapping Method

The mapping of PDCCHs to resource elements can be based on a structure of control unit (CU), which in essence is a set of a pre-defined number of resource elements. One or more CUs can be used to transmit a single PDCCH. For example, a PDCCH may be transmitted by one, two, four, or eight CUs, which is known as aggregation level. The required number of CUs for a certain PDCCH depends on the payload size of the control information (DCI payload) and the channel-coding rate. This is used to realize link adaptation for the PDCCH; if the channel conditions for the terminal to which the PDCCH is intended are disadvantageous, a larger number of CUs needs to be used compared to the case of advantageous channel conditions. The number of CUs used for a PDCCH is also referred to as the aggregation level. The number of CUs available for PDCCHs depends on the size of the control region, e.g., PDCCH transmission BW and number of OFDM symbols, and the number of resources occupied by other signals/channels in the control region.

Figure 29:
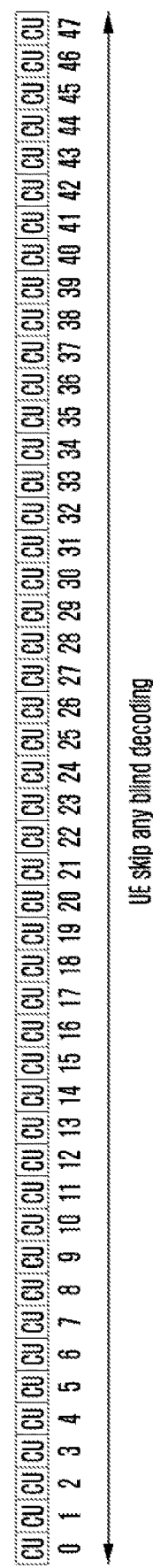
FIG. 29 illustrates that control units (CUs) available for PDCCH transmission are numbered from zero and upward according to an embodiment of the present disclosure.

FIG. 29 illustrates that CUs available for PDCCH transmission are numbered from zero and upward according to an embodiment of the present disclosure.

Referring to FIG. 29, the CUs available for PDCCH transmission can be numbered from zero and upward. A specific PDCCH can thus be identified by the numbers of the corresponding CUs.

Figure 30:
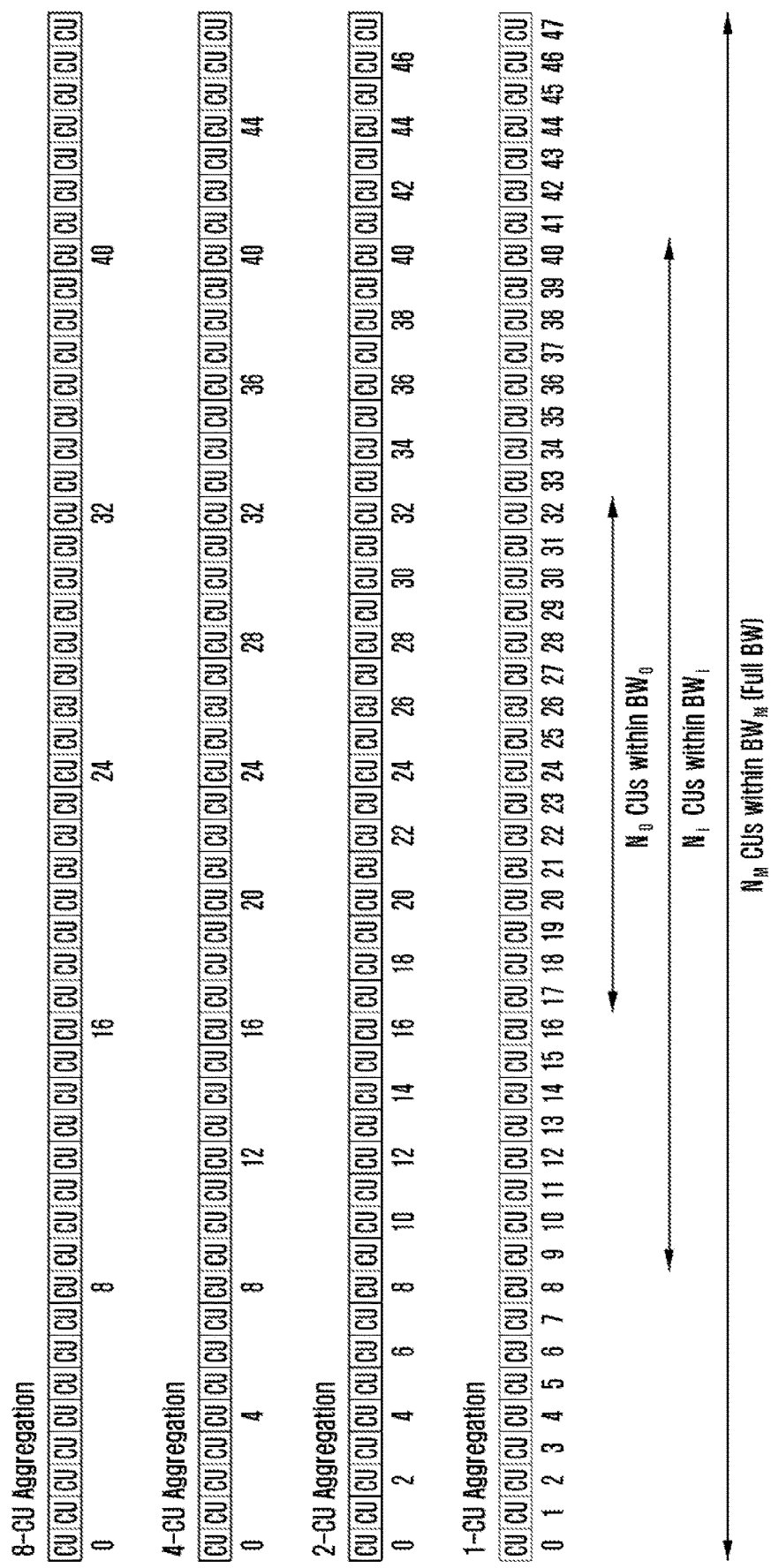
FIG. 30 illustrates an aggregation of control channel elements (CCEs) according to an embodiment of the present disclosure.

FIG. 30 illustrates an aggregation of control channel elements (CCEs) according to an embodiment of the present disclosure.

Referring to FIG. 30, in case of PDCCH using aggregated CUs, to reduce the complexity, certain restrictions on the aggregation of contiguous CUs have been specified. For example, an aggregation of eight CCEs can only start on CCE numbers evenly divisible by 8, as illustrated in FIG. 8B. The same principle is applied to the other aggregation levels.

The PDCCH transmission needs to consider the possibility that there are UEs with minimum supported bandwidth, e.g., $BW_0$. Therefore, the cell-specific common control information needs to be transmitted by PDCCH within the bandwidth $BW_0$, which can be the common control subband described before. This guarantees that all UEs can receive the common control information, e.g., the scheduling information of the system information transmission. The response to UEs' random access can also be transmitted by PDCCH within the bandwidth $BW_0$, since the gNB may have no information about the UE BW when receiving a random access request.

After UEs successfully access the system, the UEs may inform the UE capability (including the UE BW information) to the gNB. The gNB has information of BW information of all connected UEs. Based on the traffic and capability of accessed UEs, the gNB may decide the bandwidth used for PDCCH transmission. The gNB may indicate the supported BW cases for PDCCH transmission and reception. This can be signaled in the MIB or SIB as cell-specific information. For a UE with bandwidth $BW_i$, the gNB may signal a supported control subband case for UE to monitor PDCCH, as UE-specific information. The signaled control subband case for PDCCH monitoring to UE can be equal to or less than the UE BW, to allow be able to monitor the PDCCH transmission.

Figure 31:
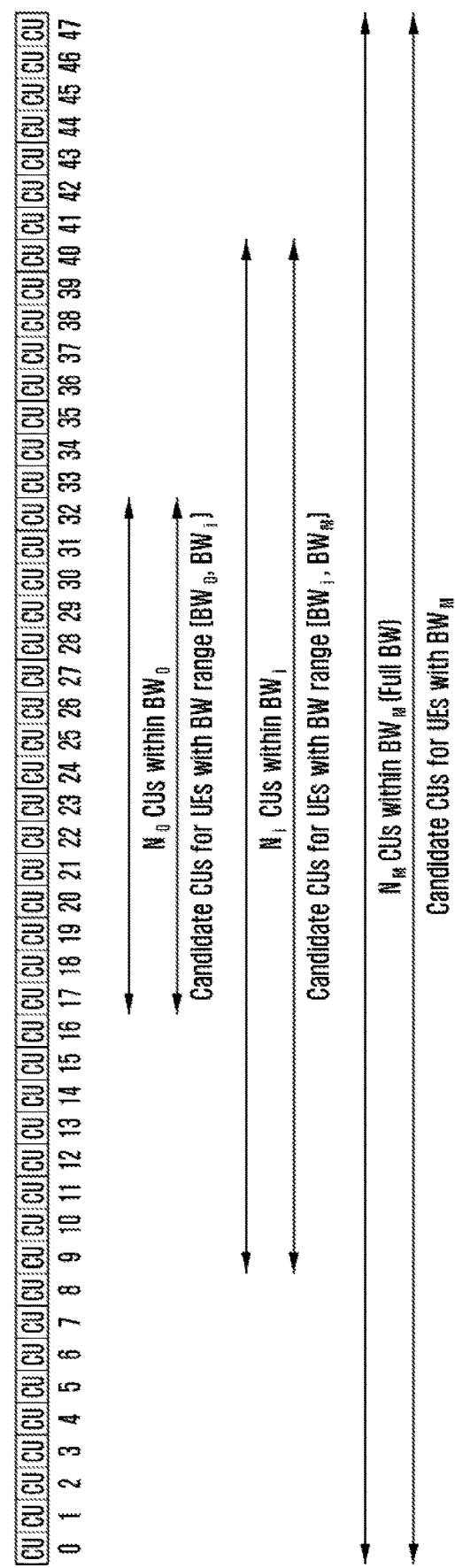
FIG. 31 illustrates that CUs used for PDCCH transmission are located within the control subband according to an embodiment of the present disclosure.

FIG. 31 illustrates that CUs used for PDCCH transmission are located within the control subband according to an embodiment of the present disclosure.

To transmit PDCCH to the UEs with different control subband, it should be ensured that the CUs used for PDCCH transmission is located within the control subband.

Referring to FIG. 31, there are a total of NM CUs within the system BW, and $N_i$ CUs within a given bandwidth $BW_i$. The UE which has a bandwidth during the range ($BW_i$, $BW_{i+1}$) can be configured to receive the PDCCH within a bandwidth $BW_i$.

Due to the special feature above, the CU mapping needs to be designed in an efficient manner. As discussed above, a CU is composed of a pre-defined number of resource element groups (REGs). The REG may be comprised of a fixed number of useful REs based on a pre-defined rule, or can be one ore multiple PRBs. The following methods can be considered to construct a CU:

Option 1:

A CU is constructed by K consecutive REGs in one OFDM symbol. Option 1a: The CUs can be constructed from one side of the PDCCH transmission BW. In an OFDM symbol, the first K consecutive REGs from the lower frequency side of the PDCCH transmission BW become one CU, and the next K consecutive REGs become another CU, and so on.

Option 1b: The CUs can be constructed from the centre of the PDCCH transmission BW. In an OFDM symbol, from the centre to the higher frequency side of the PDCCH transmission BW, every K consecutive REGs become one CU. Similarly, from the centre to the lower frequency side of the PDCCH transmission BW, every K consecutive REGs become one CU.

Option 1c: In an OFDM symbol, around the centre frequency of the PDCCH transmission BW, one CU is composed of the surrounding closest K REGs, e.g., K/2 REGs from the higher frequency side and K/2 REGs from the lower frequency side. Similarly, the next CU is composed of the next available closest K REGs, half from the higher frequency side and another half from the lower frequency side, and so on.

Option 2:

A CU is constructed by K REGs from all OFDM symbols in the control region.

Option 2a: The CUs can be constructed from one side of the PDCCH transmission BW. From the lower frequency side of the PDCCH transmission BW, a CU collects the first K consecutive REGs in the order of first lowest subcarrier index, and then lowest symbol index, and so does the remaining CUs.

Option 2b: The CUs can be constructed from the center of the PDCCH transmission BW. From the center to the higher frequency side of the PDCCH transmission BW, a CU collects the first K consecutive REGs in the order of first lowest subcarrier index, and then lowest symbol index, and so does the remaining CUs. From the center to the lower frequency side of the PDCCH transmission BW, a CU collects the first K consecutive REGs in the order of first highest subcarrier index, and then highest symbol index, and so does the remaining CUs.

Option 2c: The CUs can be constructed around the centre of the PDCCH transmission BW. From the centre frequency of the PDCCH transmission BW, a CU collects the first K REGs in the order of first the closest subcarrier index, and then lowest symbol index, and so does the remaining CUs.

Figure 32:
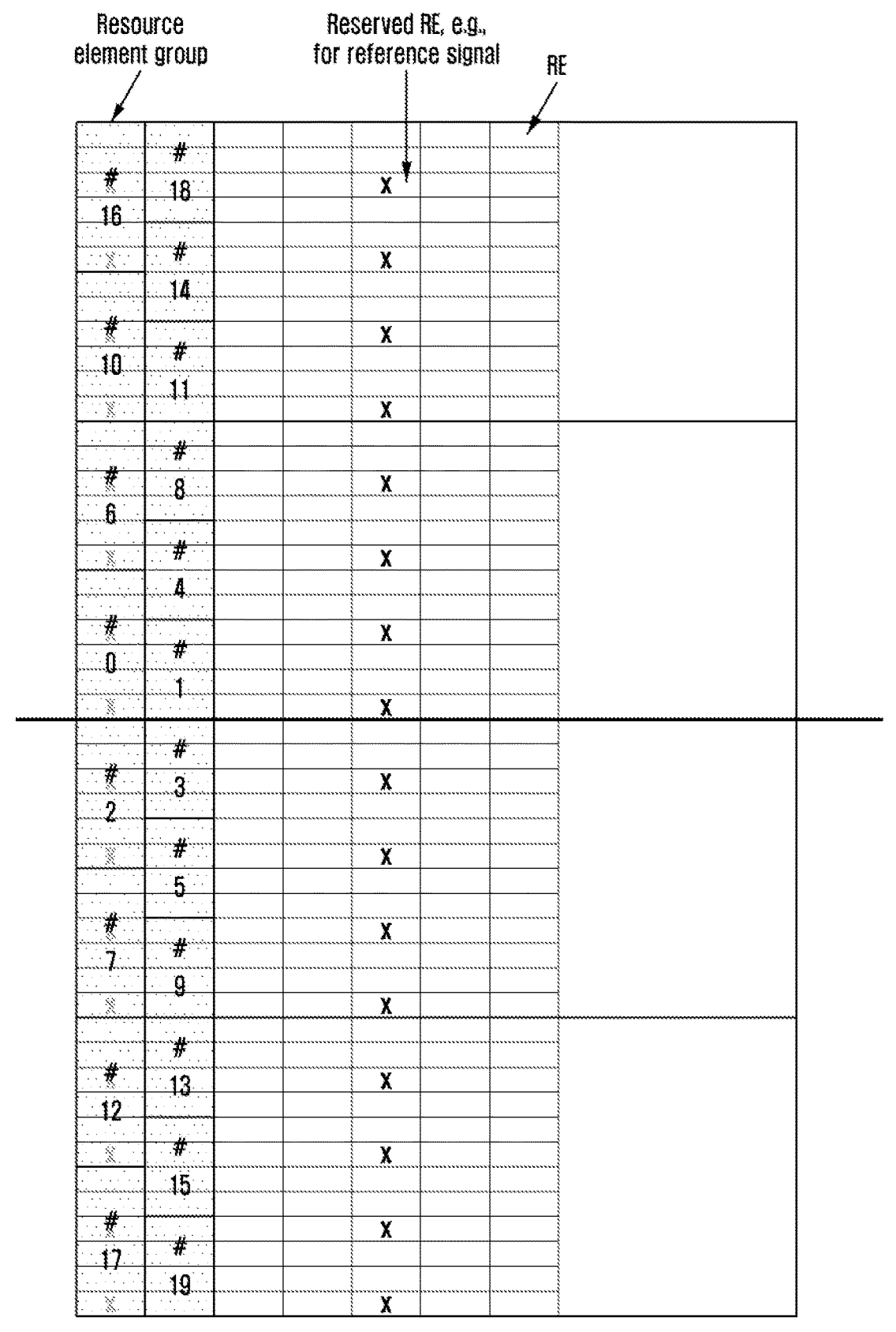

FIG. 32 illustrates that the REGs are indexed in the order of closest subcarrier index first, and then lowest symbol index according to an embodiment of the present disclosure.

Referring to FIG. 32, where the REGs are indexed in the order of first the closest subcarrier index, and then lowest symbol index. A first CU can then composed by the REGs from index 0 to K−1, and the next CU is composed by the resource element groups from index K to 2*K−1, and so on.

Figure 33:
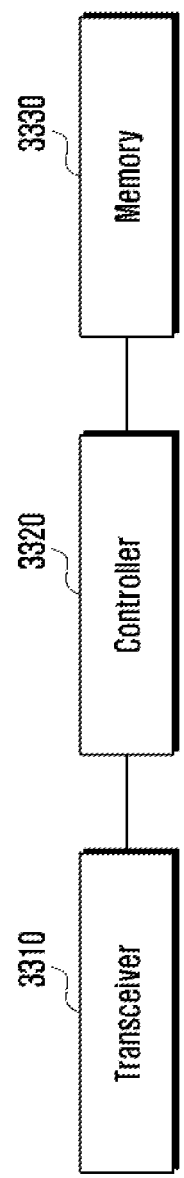
FIG. 33 illustrates a structure of a UE according to an embodiment of the present disclosure.

FIG. 33 illustrates a structure of a UE according to an embodiment of the present disclosure.

Referring to FIG. 33, the UE may include a transceiver or transmission/reception unit 3310, a controller or processor 3320, and a storage unit 3330. In the present disclosure, the controller 3320 may be defined as a circuit or an application specific integrated circuit or at least one processor.

The transceiver 3310 may transmit and receive signals with other network entities. The transceiver 3310 may receive system information from, for example, a base station and may receive a synchronization signal or a reference signal.

The controller 3320 may control the overall operation of the UE according to the embodiment of the present disclosure. For example, the controller 3320 may control the signal flow between each block to perform the operation according to the flowcharts described above. In detail, controller 3320 may control operations proposed by the present disclosure.

The controller 3320 is coupled with the transceiver 3310 and the controller 3320 is configured to detect synchronization signals, obtain first numerology information for the synchronization signals, decode a physical broadcast channel (PBCH) based on the first numerology information, obtain second numerology information for a physical downlink control channel (PDCCH) according to a result of the decoding, and receive control information on the PDCCH based on the second numerology information.

The second numerology information indicates a subcarrier spacing for the PDCCH within a subcarrier spacing set. The subcarrier spacing set is for lower frequency bands or higher frequency bands, the lower frequency bands are below reference frequency band and the higher frequency bands are above the reference frequency band.

According to an embodiment, the controller 3320 is configured to obtain first information on bandwidth for PDCCH transmission according to a result of the decoding.

According to another embodiment, the controller 3320 is configured to obtain second information according to a result of the decoding, the second information including at least one of a candidate PRB for PDCCH transmission and offset between a center of the PDCCH transmission and a reference frequency.

According to the other embodiment, the controller 3320 is configured to obtain third information on a start symbol index to monitor the PDCCH according to a result of the decoding.

The storage unit 3330 may store at least one of information transmitted and received through the transceiver 3310 and information generated through the controller 3320.

Figure 34:
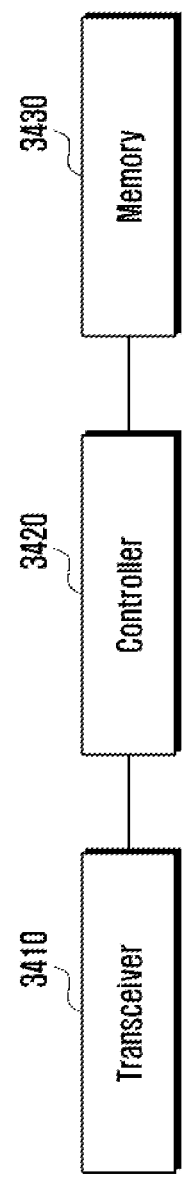
FIG. 34 illustrates a structure of a base station according to an embodiment of the present disclosure.

FIG. 34 illustrates a structure of a base station according to an embodiment of the present disclosure.

Referring to FIG. 34, a base station (or gNB) may include a transceiver or transmission/reception unit 3410, a controller or processor 3420, and a storage unit 3430. In the present disclosure, the controller 3420 may be defined as a circuit or an application specific integrated circuit or at least one processor.

The transceiver 3410 may transmit and receive signals with other network entities. The transceiver 3410 may transmit system information to the UE, for example, and may transmit a synchronization signal or a reference signal.

The controller 3420 may control the overall operation of the base station according to the embodiment of the present disclosure. For example, the controller 3420 may control the signal flow between each block to perform the operation according to the flowcharts described above. In particular, the controller 3420 may control operations proposed by the present disclosure to support flexible UE bandwidth.

The controller 3420 is coupled with the transceiver 3410 and is configured to transmit, to user equipment (UE), synchronization signals and first numerology information for the synchronization signals, generate second numerology information for a physical downlink control channel (PDCCH), transmit, to the UE, the second numerology information on a physical broadcast channel (PBCH) based on the first numerology information, and transmit, to the UE, control information on the PDCCH based on the second numerology information.

The second numerology information indicates a subcarrier spacing for the PDCCH within a subcarrier spacing set. The subcarrier spacing set is for lower frequency bands or higher frequency bands, the lower frequency bands are below reference frequency band and the higher frequency bands are above the reference frequency band.

According to an embodiment, the controller 3420 is configured to generate at least one of first information on bandwidth for PDCCH transmission, second information including at least one of a candidate PRB for PDCCH transmission and offset between a center of the PDCCH transmission and a reference frequency, and third information on a start symbol index to monitor the PDCCH.

The storage unit 3430 may store at least one of information transmitted/received through the transceiver 3410 and information generated through the controller 3420.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving, from a base station, a primary synchronization signal (PSS) and a secondary synchronization signal (SSS) based on a first subcarrier spacing;
   receiving, from the base station, a master information block (MIB) on a frequency band, based on the first subcarrier spacing, wherein the MIB includes first information on a second subcarrier spacing for physical downlink control channel (PDCCH) and second information on a first symbol index in a slot for monitoring the PDCCH;

identifying, based on the first information included in the MIB, the second subcarrier spacing for the PDCCH from one of a first subcarrier spacing set or a second subcarrier spacing set corresponding to the frequency band on which the MIB is received; and receiving, from the base station, the PDCCH based on the second subcarrier spacing.

2. The method of claim 1, wherein the first subcarrier spacing set corresponds to a lower frequency band and the second subcarrier spacing set corresponds to a higher frequency band.

3. The method of claim 1, wherein the first information included in the MIB includes an indication bit corresponding to the second subcarrier spacing for the PDCCH.

4. The method of claim 1, further comprising:
receiving, from the base station, a system information block (SIB) scheduled by the PDCCH based on the second subcarrier spacing.

5. A method performed by a base station in a wireless communication system, the method comprising:
transmitting, to a terminal, a primary synchronization signal (PSS) and a secondary synchronization signal (SSS) based on a first subcarrier spacing;
transmitting, to the terminal, a master information block (MIB) on a frequency band, based on the first subcarrier spacing, wherein the MIB includes first information on a second subcarrier spacing for physical downlink control channel (PDCCH) and second information on a first symbol index in a slot for the PDCCH; and
transmitting, to the terminal, the PDCCH based on the second subcarrier spacing,
wherein the second subcarrier spacing is indicated by the first information included in the MIB from one of a first subcarrier spacing set or a second subcarrier spacing set corresponding to the frequency band on which the MIB is transmitted.

6. The method of claim 5, wherein the first subcarrier spacing set corresponds to a lower frequency band and the second subcarrier spacing set corresponds to a higher frequency band.

7. The method of claim 5, wherein the first information included in the MIB includes an indication bit corresponding to the second subcarrier spacing for the PDCCH.

8. The method of claim 5, further comprising:
transmitting, to the terminal, a system information block (SIB) scheduled by the PDCCH based on the second subcarrier spacing.

9. A terminal in a wireless communication system, the terminal comprising:
a transceiver configured to transmit and receive a signal; and
a controller configured to:
receive, from a base station, a primary synchronization signal (PSS) and a secondary synchronization signal (SSS) based on a first subcarrier spacing,
receive, from the base station, a master information block (MIB) on a frequency band, based on the first subcarrier spacing, wherein the MIB includes first information on a second subcarrier spacing for a physical downlink control channel (PDCCH) and second information on a first symbol index in a slot for the PDCCH,
identify, based on the first information included in the MIB, the second subcarrier spacing for the PDCCH from one of a first subcarrier spacing set or a second subcarrier spacing set corresponding to the frequency band on which the MIB is received, and
receive, from the base station, the PDCCH based on the second subcarrier spacing.

10. The terminal of claim 9, wherein the first subcarrier spacing set corresponds to a lower frequency band and the second subcarrier spacing set corresponds to a higher frequency band.

11. The terminal of claim 9, wherein the first information included in the MIB includes an indication bit corresponding to the second subcarrier spacing for the PDCCH.

12. The terminal of claim 10, wherein the controller is further configured to receive, from the base station, a system information block (SIB) scheduled by the PDCCH based on the second subcarrier spacing.

13. A base station in a wireless communication system, the base station comprising:
a transceiver configured to transmit and receive a signal; and
a controller configured to:
transmit, to a terminal, a primary synchronization signal (PSS) and a secondary synchronization signal (SSS) based on a first subcarrier spacing,
transmit, to the terminal, a master information block (MIB) on a frequency band, based on the first subcarrier spacing, wherein the MIB includes first information on a second subcarrier spacing for a physical downlink control channel (PDCCH) and second information on a first symbol index in a slot for monitoring the PDCCH, and
transmit, to the terminal, the PDCCH based on the second subcarrier spacing,
wherein the second subcarrier spacing is indicated by the first information included in the MIB from one of a first subcarrier spacing set or a second subcarrier spacing set corresponding to the frequency band on which the MIB is transmitted.

14. The base station of claim 13, wherein the first subcarrier spacing set corresponds to a lower frequency band and the second subcarrier spacing set corresponds to a higher frequency band.

15. The base station of claim 13, wherein the first information included in the MIB includes an indication bit corresponding to the second subcarrier spacing for the PDCCH.

16. The base station of claim 13, wherein the controller is further configured to transmit, to the terminal, a system information block (SIB) scheduled by the PDCCH based on the second subcarrier spacing.

* * * * *